(12) United States Patent
Coots

(10) Patent No.: US 8,636,460 B1
(45) Date of Patent: Jan. 28, 2014

(54) GONDOLA CARRIAGE ASSEMBLY

(75) Inventor: William R. Coots, Lebanon Junction, KY (US)

(73) Assignee: B & B Metals, Inc., Shepherdsville, KY (US)

(*) Notice: Subject to any disclaimer, the term of this patent is extended or adjusted under 35 U.S.C. 154(b) by 698 days.

(21) Appl. No.: 12/732,996

(22) Filed: Mar. 26, 2010

Related U.S. Application Data

(62) Division of application No. 12/732,731, filed on Mar. 26, 2010, now Pat. No. 8,393,846.

(51) Int. Cl.
*B65G 67/00* (2006.01)

(52) U.S. Cl.
USPC .......................................... 414/394; 414/572

(58) Field of Classification Search
USPC ........... 414/572, 339, 333, 390, 394; 295/8.5, 295/30.1
See application file for complete search history.

(56) References Cited

U.S. PATENT DOCUMENTS

| | | | |
|---|---|---|---|
| 699,994 A * | 5/1902 | White | 301/53 |
| 890,157 A | 6/1908 | Miller et al. | |
| 890,158 A | 6/1908 | Miller et al. | |
| 961,532 A * | 6/1910 | Reinehr | 105/144 |
| 1,408,238 A * | 2/1922 | Alles | 301/51 |
| 1,802,773 A * | 4/1931 | Nelson | 301/29.2 |
| 1,816,820 A * | 8/1931 | Bartlett | 295/8.5 |
| 1,853,572 A * | 4/1932 | Nugent | 295/8.5 |
| 1,874,192 A * | 8/1932 | Kay | 301/35.54 |
| 1,926,695 A * | 9/1933 | Hutton | 105/215.2 |
| 1,933,811 A | 11/1933 | Kossakowski | |
| 2,018,972 A * | 10/1935 | Pollock et al. | 105/72.2 |
| 2,101,711 A * | 12/1937 | Hubbell | 105/72.2 |
| 2,120,098 A * | 6/1938 | Hug | 295/8.5 |
| 2,135,307 A * | 11/1938 | Keator | 295/8.5 |
| 2,311,304 A | 2/1943 | Lehti et al. | |
| 2,657,947 A * | 11/1953 | Kerner | 295/8.5 |
| 2,821,151 A * | 1/1958 | Meister et al. | 105/215.2 |
| 2,981,031 A | 4/1961 | Bonanno | |
| 3,881,612 A * | 5/1975 | Wells | 414/394 |
| 4,096,954 A | 6/1978 | Buckner | |
| 4,099,635 A | 7/1978 | Leonard et al. | |
| 4,128,180 A * | 12/1978 | Mellious | 414/339 |
| 4,175,902 A | 11/1979 | Herzog et al. | |
| 4,190,394 A | 2/1980 | Herzog et al. | |
| 4,241,811 A | 12/1980 | Buckner | |
| 4,355,584 A | 10/1982 | White, Jr. | |
| 4,377,369 A | 3/1983 | Johnson, Jr. | |
| 4,479,750 A | 10/1984 | Johnson, Jr. | |
| 4,497,257 A | 2/1985 | White, Jr. | |
| 4,534,297 A | 8/1985 | Johnson, Sr. | |
| 4,715,660 A * | 12/1987 | Juhan | 301/13.1 |
| 4,829,907 A | 5/1989 | Theurer et al. | |
| 4,830,562 A | 5/1989 | Frederking | |
| 4,911,599 A | 3/1990 | Theurer et al. | |
| 5,066,188 A * | 11/1991 | Bush | 414/339 |
| 5,120,180 A | 6/1992 | Egan et al. | |
| 5,167,190 A | 12/1992 | Galand | |
| 5,183,369 A | 2/1993 | Warren, Jr. et al. | |

(Continued)

*Primary Examiner* — Saul Rodriguez
*Assistant Examiner* — Glenn Myers
(74) *Attorney, Agent, or Firm* — Middleton Reutlinger; James E. Cole

(57) ABSTRACT

The device pertains to a carriage which may be separate or integrated with a mobile, powered loading vehicle to load or unload railroad track materials to or from a gondola and a method thereof.

14 Claims, 23 Drawing Sheets

(56) References Cited

U.S. PATENT DOCUMENTS

| | | | |
|---|---|---|---|
| 5,289,780 A | | 3/1994 | Bounds |
| 5,628,606 A | * | 5/1997 | Herzog et al. ............... 414/339 |
| 5,904,098 A | | 5/1999 | Theurer et al. |
| 6,101,953 A | | 8/2000 | Spata |
| 6,561,742 B1 | | 5/2003 | Crawford et al. |
| 6,981,452 B2 | | 1/2006 | Herzog et al. |
| 7,156,603 B2 | | 1/2007 | Marcotte |
| 7,686,561 B2 | | 3/2010 | Smith et al. |
| 2005/0225105 A1 | * | 10/2005 | Meyer ........................ 295/8.5 |
| 2005/0244255 A1 | | 11/2005 | Smith et al. |
| 2007/0297882 A1 | | 12/2007 | Villar et al. |

* cited by examiner

GONDOLA CARRIAGE ASSEMBLY

CROSS-REFERENCE TO RELATED DOCUMENTS

This divisional application claims priority to and benefit from, currently pending, U.S. patent application Ser. No. 12/732,731, filed on Mar. 26, 2010.

TECHNICAL FIELD

This device pertains to a gondola carriage assembly. More specifically, the device pertains to a carriage which may be separate or integrated with a mobile, powered loading vehicle to load or unload railroad track materials to or from a gondola.

BACKGROUND

Prior methods of loading and unloading open-top railroad cars, or gondolas as they are called, have included positioning large cranes adjacent the railroad tracks where the gondola will be positioned. From this location, the crane may remove railroad track materials from the gondola and place them along side the railroad, or alternatively may make handle spent materials which are positioned along side the railroad and place them inside the gondola. More recent designs have utilized backhoes which are positioned along the upper portions of the gondola and utilize the boom of the backhoe to move the backhoe along the upper portion of the gondola. This system can be dangerous due to shifting weight of the backhoe and potential tipping issues which may result in damage to the backhoe and injuries to the operator. Other systems utilize a grasping claw to grasp a sidewall of the gondola and move the gondola on to or down from the upper portion of the gondola. Various systems require remote operation as a means of alleviating danger to an operator who would otherwise be inside a cab of the backhoe or other such loading vehicle.

Even further, some prior art systems utilize a rail structure which must be connected to the upper edges of the gondola. The loading vehicle may then be positioned on the rail structure allowing movement of the loading vehicle and boom relative to the gondola. These systems are difficult to use for various reasons. Some reasons are related to safety and potential hazards in operation. Others are inefficient with respect to time and therefore cost too much in wasted labor and equipment rental time to operate efficiently.

A device is needed to overcome these and other deficiencies allowing faster, safer, and more efficient means of loading and unloading gondola cars during railroad maintenance procedures while allowing transfer of the loading vehicle from gondola to adjacent gondola easily and efficiently.

SUMMARY

A gondola carriage assembly, for use with a gondola having at least two substantially parallel walls extending in a longitudinal direction, the two substantially parallel walls each having an upper edge, comprises a carriage defined by a frame, the frame formed of a plurality of structures forming a support for a track-driven loading machine, the carriage further comprising a plurality of axle assemblies rotatably connected to the frame, the axle assemblies each having an axle and a gondola wheel at ends of the axle, the gondola wheels positioned to engage the upper edges of the gondola and allow movement of the carriage and the loading machine along the gondola, the axle assemblies further having engagement portions to interface with tracks of the track-driven loading machine and to cause of rotation the gondola wheels along the upper edges of the gondola. The gondola carriage assembly further comprises a connection element extending between the loading machine and the carriage, the connection element inhibiting movement of the loading machine relative to the carriage. The gondola carriage assembly wherein the frame comprises at least a first longitudinally extending beam and a second longitudinally extending beam. The gondola carriage assembly further comprises at least two laterally extending beams extending between the longitudinally extending beams. The gondola carriage assembly wherein the at least one frame has at least three laterally extending beams. The gondola carriage assembly wherein each of the at least two laterally extending beams have one of the axle assemblies connected thereto. The gondola carriage assembly wherein each of the plurality of axles have the wheel-like structures at a first lateral end and a second lateral end. The gondola carriage assembly wherein said axle assemblies are rotatably connected to the frame by a plurality of pillow block structures. The gondola carriage assembly wherein the carriage transmits rotation of the tracks to rotation of the gondola wheels and drives the carriage along the gondola. The gondola carriage assembly further comprising a leg axle pivotally connected to the carriage. The gondola carriage assembly further comprising legs disposed at ends of the leg axle. The gondola carriage assembly wherein the legs are rotatable from an upper position allowing movement of the loading machine and carriage along the gondola to a lower position allowing movement of the gondola beneath the loading machine and the carriage. The gondola carriage assembly wherein the legs are extendable from a first length to a second length. The gondola carriage assembly wherein the legs have a plurality of nested segments.

A gondola carriage assembly, for a gondola having a pair of longitudinally extending walls, the walls each having a forward end, a rearward end and an upper edge, comprises a carriage movably positionable on the gondola having a frame comprised of a plurality of beams, a plurality of axle assemblies rotatably connected to the frame and extending substantially transverse to the longitudinally extending walls, ends of each of the plurality of axle assemblies engaging the pair of longitudinally extending walls, a track-driven loading vehicle disposed on the carriage having at least one end-less track engaging at least one of the plurality of axle assemblies wherein rotation of the at least one end-less track causes rotation of at least a portion the plurality of axle assemblies, wherein the rotation of the at least a portion of the at least one of the plurality of axle assemblies causes movement of the carriage along the upper edges of the longitudinally extending walls. The gondola carriage assembly wherein the beams are a plurality of longitudinally extending frame members and at least two cross-braces. The gondola carriage assembly wherein each of the plurality of axle assemblies have an axle and a gondola wheel at each end of the axle. The gondola carriage assembly wherein axle assemblies to the frame cross-braces. The gondola carriage assembly wherein the axle assemblies further comprise an engagement portion which engages the end-less track of the loading vehicle. The gondola carriage assembly further comprising a leg axle extending across the frame in a direction substantially transverse to the longitudinal extending axis. The gondola carriage assembly further comprising rotatable and extendable legs connected to the leg axle. The gondola carriage assembly wherein the legs are rotated by a first actuator. The gondola carriage assembly wherein the legs are extendable by a second actuator. The gondola carriage assembly further comprising a connecting element between the carriage and the loading vehicle.

A method of using a gondola carriage assembly comprises positioning a loading vehicle on a gondola carriage wherein end-less tracks of the loading vehicle contact an engagement portion of at least one axle assembly, positioning the loading vehicle and gondola carriage on a gondola, ensuring the loading vehicle and carriage are connected to inhibit relative movement there between, rotating gondola wheels on the at least one axle assembly by rotating the end-less tracks of the loading vehicle, and, moving the gondola carriage along the gondola by the rotating of the gondola wheels. The method wherein the loading vehicle and carriage are connected by a chain. The method further comprises engaging a gondola wheel surface with the upper edge of the gondola. The method further comprises engaging the end-less tracks of the loading vehicle with three axle assemblies. The method further comprising moving the carriage and the loading vehicle along the upper edges of the gondola. The method further comprising at least one of loading or unloading the gondola with the loading vehicle. The method further comprising actuating legs on the carriage between a first position and a second position and moving at least one gondola beneath the gondola carriage.

A gondola carriage assembly, comprises a wheel driven powered vehicle having a chassis, a control cab and at least one boom controllable from the cab, first pair of tires at a forward end of said frame and a second pair of tires at a rearward end of said frame, the tires controllable from the control cab, a forward gondola axle assembly pivotally connected to said excavator and pivotable from a first position for on-road travel to a second downward position for engagement with a gondola, a first pair of forward gondola wheels disposed on the forward gondola axle assembly and a rearward pair of gondola wheels disposed on the rearward gondola axle assembly, a first pivoting gusset disposed at the forward end of the excavator chassis and a second pivoting gusset disposed at the rearward end of the excavator chassis, a forward arm extending from the first pivoting gusset to the forward axle and a rearward arm extending from the second pivoting gusset to the rearward gondola axle, the first pair of vehicle tires at the forward end of the chassis engaging the forward gondola axle assembly to rotate the gondola wheels and the second pair of vehicle tires at the rearward end of the chassis engaging the gondola axle to rotate the rearward gondola wheels, an actuator extending between the chassis and each of the forward and rearward gondola axles. The gondola carriage assembly further comprising a bucket implement at a distal end of the boom. The gondola carriage assembly further comprising a gripping device disposed at an end of the boom. The gondola carriage assembly wherein the actuator is a hydraulic cylinder and piston arrangement. The gondola carriage assembly wherein the actuator is a linear actuator. The gondola carriage assembly wherein the actuator is a rotational actuator. The gondola carriage assembly wherein the forward gondola axle and the rearward gondola axle each having tire engagement areas which are engaged by the forward pair and rearward pair of tires respectively. The gondola carriage assembly wherein the forward arm is at least two arms and the rearward arm is at least two arms. The gondola carriage assembly wherein the forward and rearward arms have distal apertures, the forward and rearward axles pass through the forward and rearward arms, respectively.

A gondola carriage assembly, comprises a wheel driven excavator having a chassis, a control cab, and at least one articulating boom controllable from the cab, a forward gondola axle pivotally connected to the frame and a rearward gondola axle pivotally connected to the frame, an actuator and linkage to pivot the gondola axle between a first position for on-road travel and a second position for engagement with a gondola, a plurality of tires extending from the chassis of the wheel drive excavator, the forward and rearward axles of the gondola being positioned to engage the plurality of tires when the axles are in the second position, gondola wheels disposed at ends of the forward and rearward axles and rotating when the forward and rearward axles engage the plurality of wheels of he wheel driven excavator. The gondola carriage assembly further comprising a gusset connected the actuator and the gondola axle.

A gondola carriage assembly, comprises a mobile, powered loading vehicle having at least a forward pair of wheels and a rearward pair of wheels, the loading vehicle generally having an upper portion which is pivotally connected to a lower portion, a forward arm connected to a chassis and a rearward arm connected to the chassis, the forward and rearward arms each receiving an axle having gondola wheel assemblies, the axles having an engagement area which engages the forward pair of tires and the rearward pair of tires, respectively, the forward arm and the rearward arm having a first position wherein the axles are spaced from the at least forward pair of tires and rearward pair of tires, the forward arm and the rearward arm having a second position wherein the at least forward pair of tires and rearward pair of tires are engaged by the engagement area of the axles, an actuatable linkage connected to at least one of the arms or the axles to move the axles from a first position to a second position.

A gondola carriage assembly for use with a gondola, comprises a mobile, powered wheel driven loading vehicle having an upper portion and a lower portion, the upper portion pivotally connected to the lower portion, the lower portion including a chassis having a forward end and a rearward end, a plurality of wheel assemblies at the forward end and the rearward end for movement over ground, a cab and at least one power actuated boom controllable from the cab, the boom and the cab disposed on the upper portion of the mobile, powered wheel driven loading vehicle, the boom having at least one portion having a first end and a second distal end, the second distal end having an implement for adding material to or removing material from he gondola, each of the plurality of wheel assemblies including a gondola wheel, the gondola wheel connected to a wheel assembly and rotatable with the wheel assembly, each of the gondola wheels having a first flange of a first diameter, a second flange of a second diameter, and a wheel hub between the first flange and the second flange, he wheel hub having a diameter which is less than the first diameter and the second diameter, a gondola wheel connected to each of the plurality of wheels near corners of the wheel driven loading vehicle, the gondola wheels each rotating with rotation of each corresponding the plurality of wheels of the wheel driven loading vehicle, the gondola wheel hub of each of the gondola wheels engaging upper edges of the gondola, and the flanges capturing the upper edges inhibiting excessive lateral movement of the gondola wheels relative to the upper edges, a stabilizer bar disposed at one end of the carriage assembly, the stabilizer bar capable of engaging an upper of the gondola to stabilize the mobile, the stabilizer bar being extendable from a first length to a second length to allow for over-the-road travel. The gondola carriage assembly further comprising a power source for powering the loading vehicle. The gondola carriage assembly wherein the boom is an articulating boom. The gondola carriage assembly wherein the gondola wheel hub has an outer surface with a grip-aiding surface. The gondola carriage assembly further comprising a gripping material on an outer surface of said gondola wheel. The gondola carriage assembly wherein each of the gondola wheels comprise a connection flange for connection to each of the wheel assemblies. The gondola carriage assembly wherein the connection flange is disposed on the hub. The gondola carriage assembly wherein one of the first flange and the second flange is curved. The gondola carriage assembly wherein the first flange and the second flange having stiffening flanges.

A gondola carriage assembly comprises a mobile, powered wheel driven machine having an upper portion and a lower portion, the upper and lower portions being rotatably connected, the lower portion having a chassis, a first pair of parallel tire assemblies and a second pair of tire assemblies connected to the chassis, a cab and an actuatable boom disposed on the upper portion, the actuatable boom having a first end and a second end, first and second gondola wheel assemblies located at first and second outer ends of the first pair of parallel tire assemblies respectively, the gondola wheel assembly including at least one gondola wheel, the first and second wheel assemblies connected to the first pair of parallel tire assemblies and rotatable with the first pair of parallel tire assemblies, third and fourth gondola wheel assemblies located at first and second outer ends of the second pair of parallel wheel assemblies respectively, the third and fourth wheels connected to said second pair of parallel tire assemblies and rotatable with the second pair of parallel tire assemblies, a power source and transmission for driving the first pair of tire assemblies, the second pair of tire assemblies and the gondola wheel assemblies, each of the gondola wheel assemblies having a first flange of a first diameter, a second flange of a second diameter, and an intermediate trough region extending between the first and second flange having a diameter less than the first and second diameters, the first and second flange capturing an upper gondola edge in the intermediate trough to guide the gondola carriage assembly along a gondola. The gondola carriage assembly further comprising a hub having a connection flange. The gondola carriage assembly wherein the connection flange connected to the first pair of parallel tire assemblies and each of the second pair of parallel tire assemblies. The gondola carriage assembly wherein the connection flange disposed at an end of each of the gondola wheel assemblies. The gondola carriage assembly further comprises at least one stabilizer at a front of the driven machine and at least one stabilizer at a rear of the driven machine. The gondola carriage assembly further comprising extenders on at least one of the front stabilizer and at least one of the rear stabilizer.

A gondola carriage assembly, comprises a mobile, powered wheel driven loading vehicle having a upper portion rotatably connected to a lower portion, the upper portion having a cab, an actuatable boom and an implement for moving material, the actuatable boom having a first end pivotally connected to the upper portion and the implement at the second end, the upper portion rotatable about a vertical axis and the actuatable boom pivotable about a horizontal axis, the actuatable boom having articulating portions, the implement disposed at a distal end of one of the articulating sections, the lower portion having a chassis and a plurality of wheel assemblies, each of the wheel assemblies having at least one wheel and at least one tire for movement over ground, at least one gondola wheel assembly connected to each of the plurality of wheel assemblies, each of the at least one gondola wheel assembly having a first flange of a first diameter and a second flange of a second diameter, a hub portion extending between the first flange and the second flange, the hub portion having a diameter which is less than at least one of the first and second flanges for receiving an upper edge of a gondola, the gondola wheel assembly rotatable with the plurality of wheel assemblies to drive the mobile powered wheel driven vehicle along the upper edge of the gondola, wherein driving of the plurality of wheel assemblies causes rotation of the gondola wheel assembly to drive the vehicle along the upper edge of the gondola, at least one first stabilizer and at least one second stabilizer, at least one of the at least one first and second stabilizers having slidably extendable tubes to engage the gondola. The gondola carriage assembly wherein the extendable tubes are slidably removable to allow for over-the-road travel.

BRIEF DESCRIPTION OF THE ILLUSTRATIONS

In order that the invention may be better understood, embodiments of the Gondola Carriage Assembly and method thereof in accordance with the present invention will now be described by way of examples. These embodiments are not to limit the scope of the present invention as other embodiments of the Gondola Carriage Assembly will become apparent to one having ordinary skill in the art upon reading the instant description. Examples of the present invention are shown in figures wherein.

DETAILED DESCRIPTION

Figure 1:
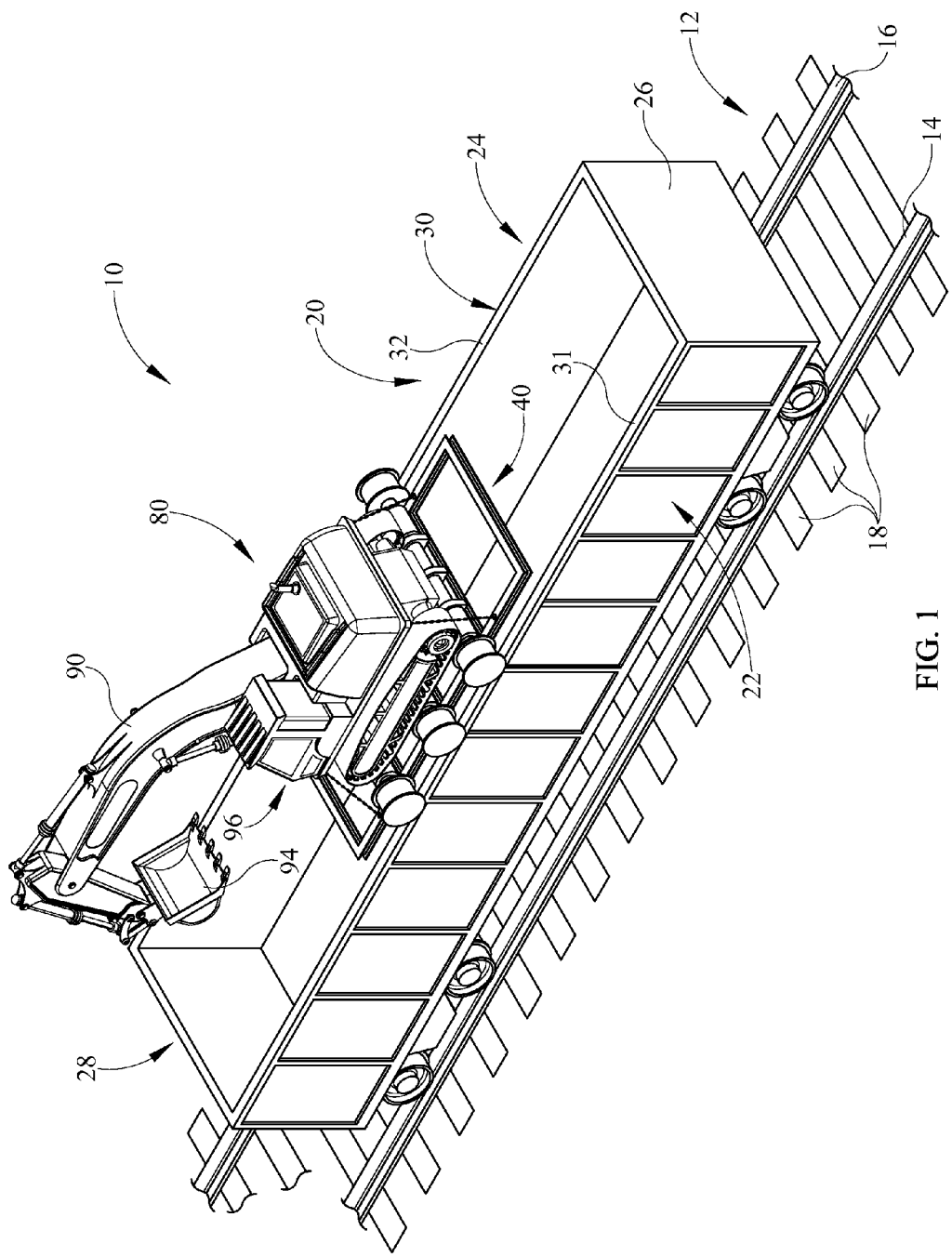
FIG. 1 depicts a perspective view of an exemplary gondola carriage assembly.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-6, a first embodiment of gondola carriage assembly is depicted. The gondola carriage assembly 10 allows a loading machine to move along the upper edges of a gondola along a carriage to which a loading machine is connected. The connection eliminates irrelative movement between the loading machine and carriage, therefore when the endless tracks of the loading machine are operated the motion is transmitted through axles and wheels to edges of the gondola allowing motion of the carriage with the loading machine thereon along the upper edges of the gondola. The motion of the carriage is therefore caused by the driving action of the endless tracks of the loading machine.

Referring initially to FIG. 1, a perspective view of the gondola carriage assembly 10 is depicted. The assembly 10 is positioned on a railroad track 12 having a first rail 14 and a second rail 16, which are positioned upon transversely extending ties 18. The first and second rails 14, 16 are substantially parallel and extend from a first desired location to a second desired location. Since railroad structures are known to one skilled in the art, they will not be discussed in great detail.

The assembly 10 may include a gondola 20 which is utilized to store used parts or new parts which are either removed from the track 12 or will be installed. Alternatively, the assembly may also be used with existing gondolas as well. In the event new parts are utilized, these new parts are typically moved in the gondola 20 to a maintenance location and unloaded for use by subsequent maintenance crews in typical railroad maintenance scenarios. Alternatively, spent or used parts may be retrieved from along the railroad track 12 and dumped into the gondola 20 for subsequent movement to and removal at an alternate site. The gondola 20 includes a first longitudinally extending wall 22 and a second longitudinally extending wall 24 which is substantially parallel to the first wall 22. Extending between the first wall 22 and the second wall 24 are first and second end walls 26, 28. These walls define a volume wherein the track materials may be stored. As previously stated, these track materials may be new or may be spent parts depending on the type of installation or maintenance being performed in the area of the railroad 12 where the gondola 20 is positioned. Each of the walls 22, 24, 26, 28 also has an upper gondola edge 30. Specifically, the first wall 22 and second wall 24 have upper edges 31, 32 respectively which in part define the upper edge 30 of gondola 20 and along which a carriage 40 is movably positioned. Positioned on the carriage 40 is a mobile, powered loading machine 80. The loading machine 80 may be defined by various types of equipment including wheeled or skid-steer type vehicles. According to the exemplary embodiment, an excavator is utilized as the loading machine 80 and moves along the upper edges 31, 32 of the gondola 20 with the carriage 40. The exemplary loading machine 80 includes at least one endless track which engages the carriage 40 and causes motion thereof relative to the gondola 20. The loading machine 80 is powered by a power source located under an upper housing or cowling but is generally represented by an exhaust stack extending upwardly from the rear of the machine 80. The power source may be gas, diesel, hybrid, fuel cell or other known technologies for powering vehicles.

Figure 2:
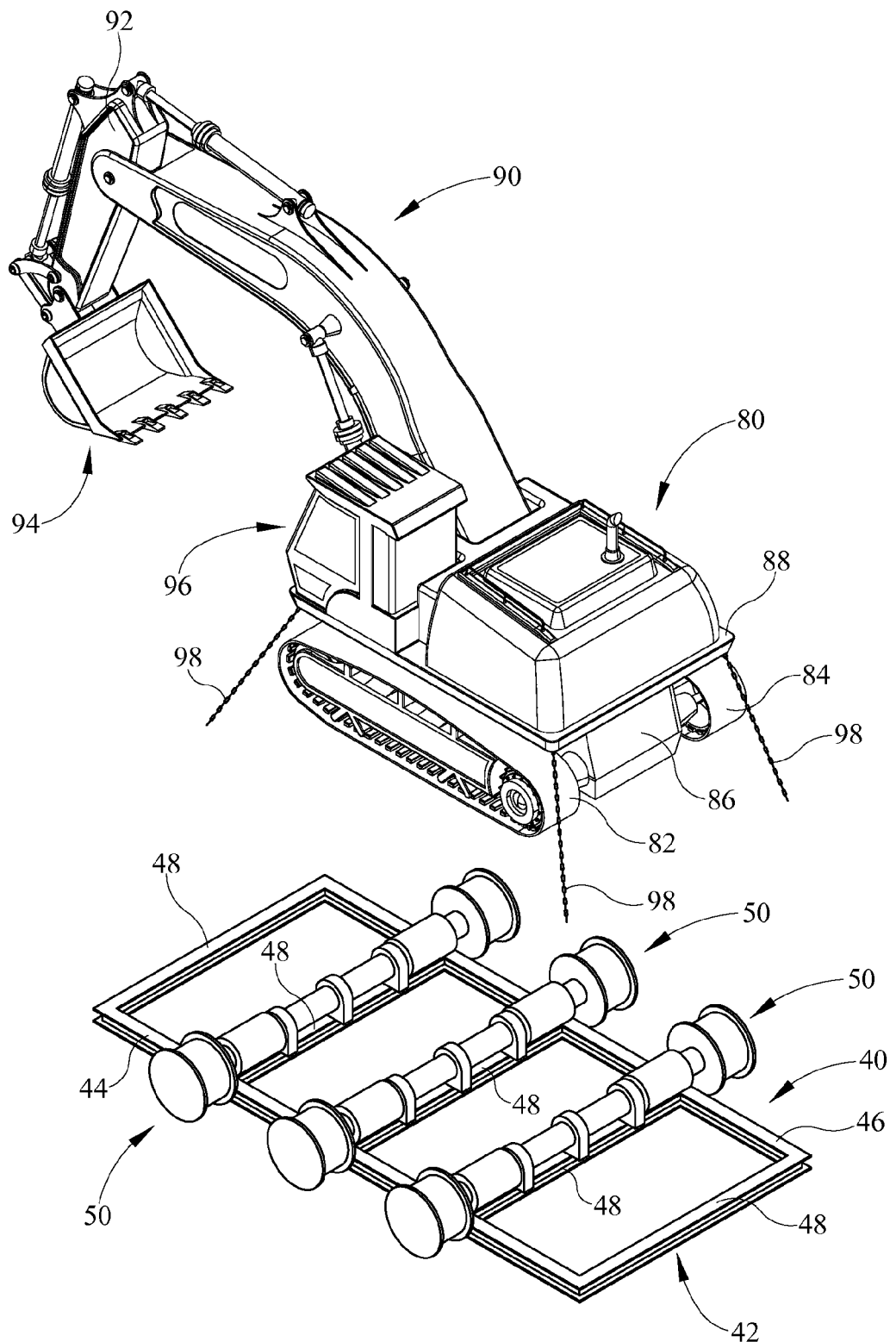
FIG. 2 depicts an exploded perspective view of the assembly of FIG. 1 with the gondola removed.

Referring now to FIG. 2, an exploded perspective view of the loading machine 80 and carriage 40 is depicted with the gondola 20 removed. The carriage 40 comprises a frame 42 which is defined by a first longitudinal frame member 44 and a second longitudinal frame member 46. These longitudinal frame members 44, 46 are a substantially parallel and extend in a direction that is also parallel to the edges 31, 32 of the gondola 20 (FIG. 1). The longitudinal frame members 44, 46 are joined by a plurality of cross-braces 48. According to the exemplary embodiment, the frame 42 includes five cross-braces 48 which extend between the first and second longitudinal members 44, 46. Each of the cross-braces 48 and the longitudinal frame members 44, 46 are formed of a metal structure, such as an I-beam, channel beam or U-beam or any rigid structure. Various structures and combinations of structures may be utilized according to the exemplary embodiment and are considered to be well within the scope of the invention as the examples are merely exemplary.

Positioned upon the cross-braces 48 are axle assemblies 50. According to the exemplary embodiment, the carriage 40 includes three axle assemblies, each of which engage the loading machine 80 and are driven by the loading machine 80 to cause movement of the carriage 40 and loading machine 80 relative to the upper edges 31, 32 of the gondola 20.

Positioned above the carriage 40 is the loading machine 80. The exemplary loading machine 80, as previously described, is an excavator, however various types of loading machines may be utilized. The loading machine 80 comprises first and second endless tracks 82, 84, a chassis 86 and a turret 88 above the chassis 86. Extending from the turret 88 is at least one boom 90. A second boom 92 extends from the end of the first boom 90 and has a bucket or other implement 94 thereon. The at least one boom 90 may be operated by hydraulic or pneumatic cylinders to provide articulation and move the implement 94. Additionally, the at least one boom 90 and the turret 88, may all be operated from a cab 96 positioned on the turret 88.

A chain or other connection element 98 extends from the loading machine 80 to the carriage 40 to inhibit movement of the loading machine 80 relative to the carriage 40. Alternatively, the connection element may be a strap, rod or turnbuckle, or other means of connecting the loading machine 80 and carriage 40. Accordingly, when the endless tracks 82, 84 are operated, the carriage 40 moves relative to the gondola 20, rather than the loading machine 80 moving relative to the carriage 40 or the gondola 20.

Figure 3:
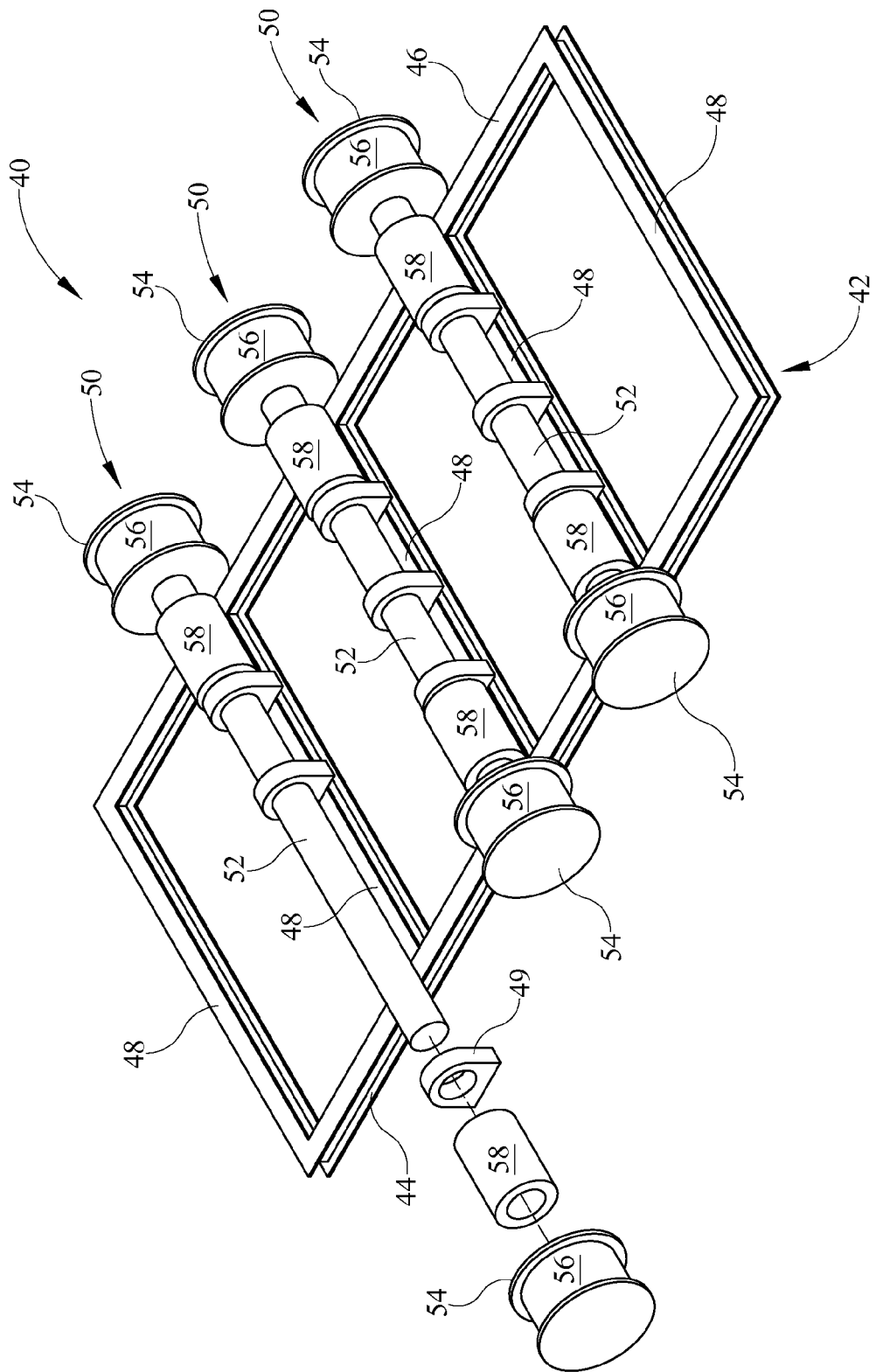
FIG. 3 depicts a perspective view of an exemplary carriage portion of the exemplary assembly.

Referring now to FIG. 3, a perspective view of the carriage 40 is depicted with the loading machine 30 the gondola 20 both removed. Disposed along three of the cross-braces 48 are axle assemblies 50. The axle assemblies 50 are rotatably connected to the cross-braces 48 by a plurality of pillow block-type assemblies 49, according to the exemplary embodiment. However, such rotatable connection should not be considered limiting as other type of rotatable connections may be utilized in place of the pillow blocks to rotatably support the axle assemblies 50 on the frame 42.

Each of the axle assemblies 50 comprises an axle 52 and first and second wheels or wheel like structures 54 at ends of the axles 52. Each of the wheels 54 includes an engagement surface 56 between flanges wherein the upper edges 31, 32 of the gondola 20 are seated for engagement. These surfaces 56 may be metal or alternatively, may be lined with a grip enhancing material such as rubber or the like. During operation, the rotation of the endless tracks 82, 84 engage the axle assemblies 50, causing rotation of the wheels 54, which causes movement of the carriage 40 and loading machine 80 thereon relative to and along the upper edge 30 of the gondola 20. The motion of the carriage 40 is in the longitudinal direction so that the loading machine 80 can access all areas of the gondola 20 to place therein or remove therefrom track materials.

Figure 4:
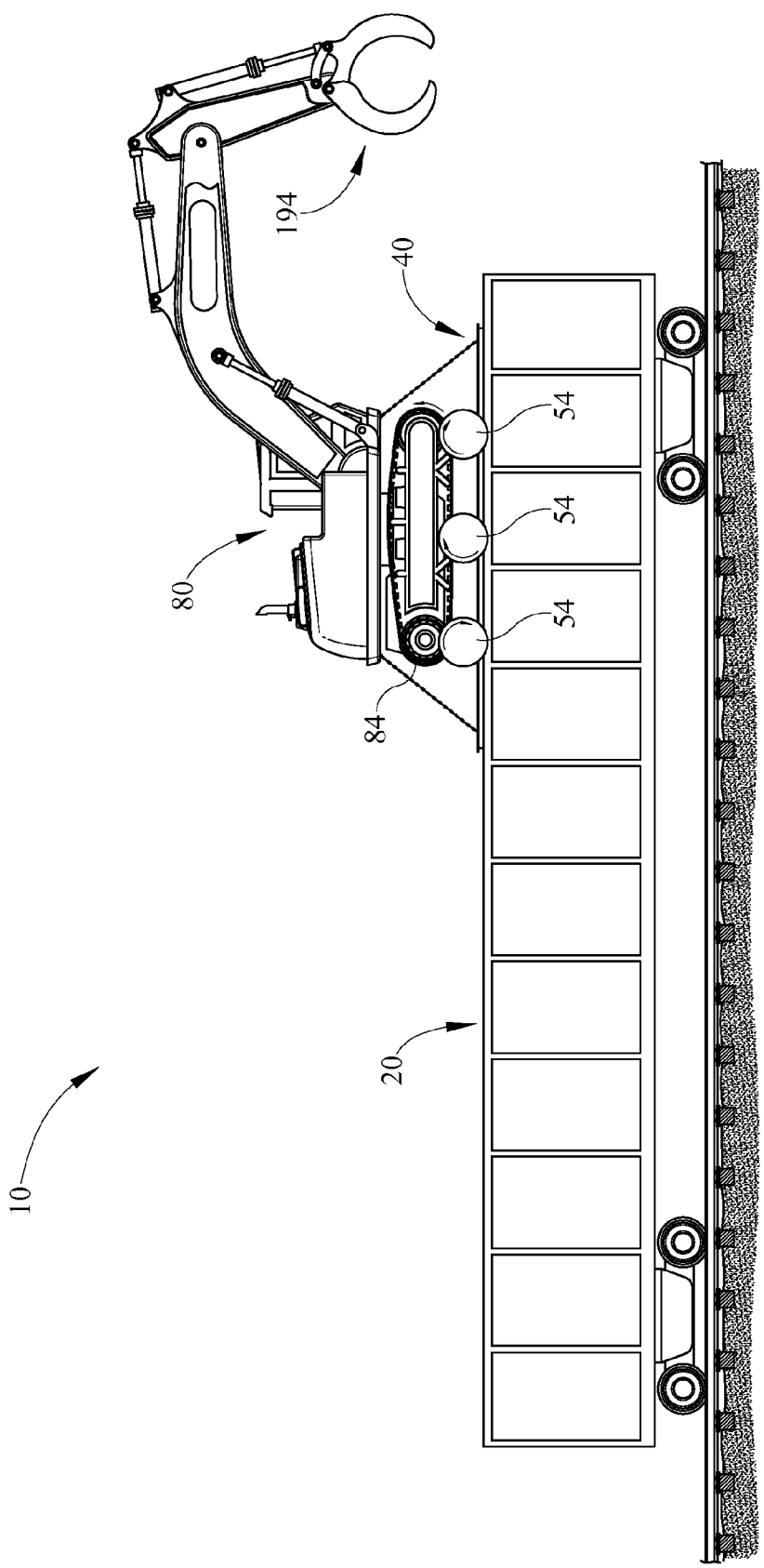
FIG. 4 depicts a side elevation view of an exemplary gondola carriage assembly and loading vehicle in a first position on a gondola.

Referring now to FIG. 4, a side elevation view is shown of the gondola carriage assembly 10. The axle assemblies 50 further comprise track engagement surfaces 58. These surfaces engage the endless tracks 82, 84 and are fixed to the axles 52. The rotation of the engagement surfaces 58 causes rotation of the axles 52 relative to the frame 42 and allows rotation of the wheels 54 which causes movement of the carriage 40 relative to the gondola 23 since the lighting machine 80 is fixed by the connection elements or chains 98 relative to the carriage 40, the loading machine 80 moves with the carriage 40 along the gondola 20. Alternatively, the carriage 40 could be formed so that rotation of engagement surface 58 only causes wheel 54 rotation. The arrow adjacent the endless track 84 depicts movement about the ends in a counter-clockwise direction. This causes movement of the axles (not shown) and wheels 54 in a clockwise direction. As a result the carriage 40 and the loading machine 80 thereon are moved to the right hand side of the gondola 20. Additionally, as shown in FIG. 4 the loading machine 80 comprises an alternative implement to bucket 94. In the embodiment shown a claw structure 194 is depicted at the end of the second boom 92.

Figure 5:
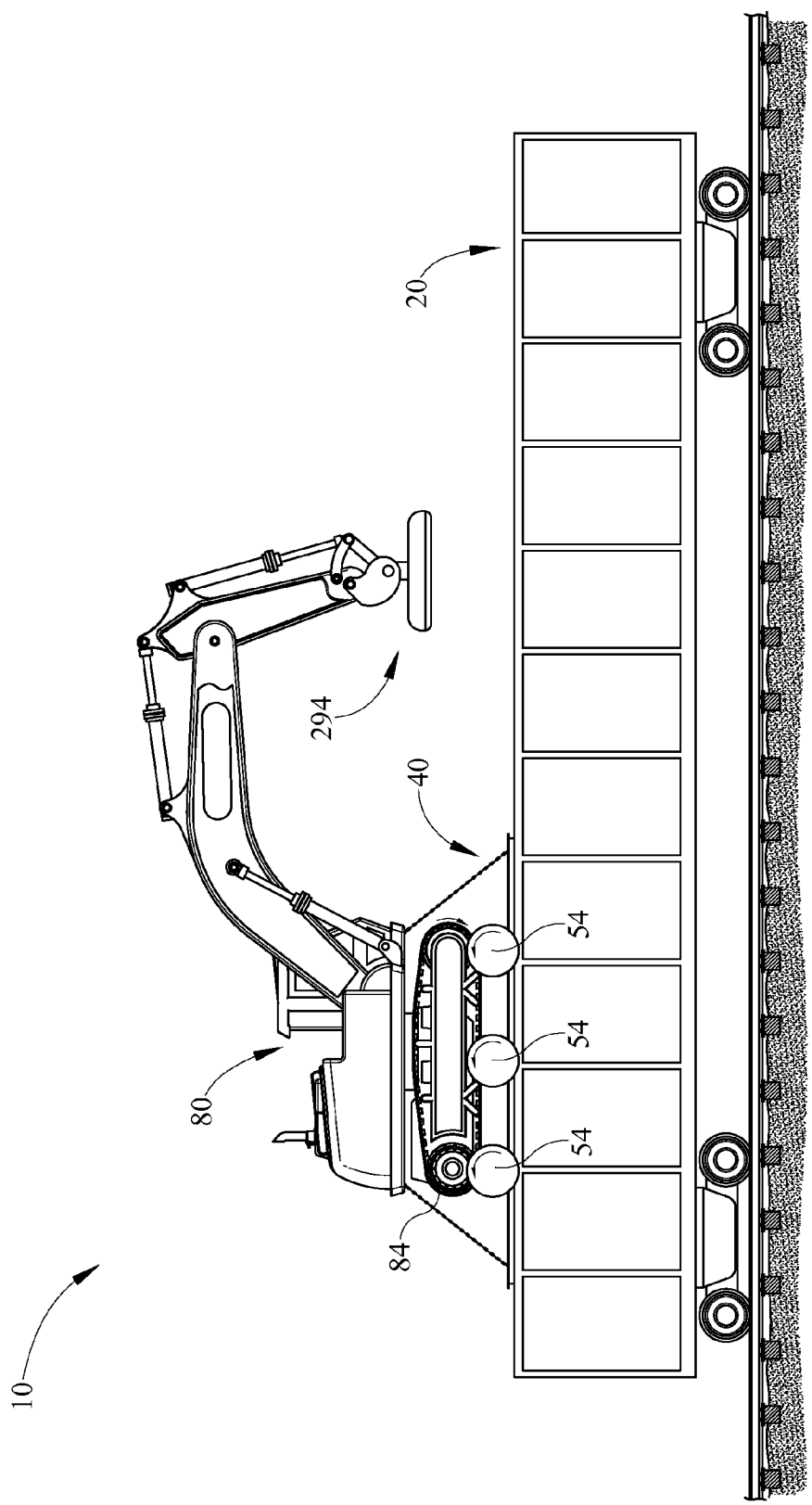
FIG. 5 depicts a side elevation view of the exemplary gondola carriage assembly and loading vehicle of FIG. 4 moved to a second position on the gondola.

Referring now to FIG. 5, a side elevation view is shown of the gondola carriage assembly 10. Referring to the instant embodiment, the loading machine 80 is positioned on the carriage 40 in the endless track 84 is rotated in a direction which is shown clockwise. This causes rotation of the wheels 54 in a counter-clockwise direction. Such rotation moves the carriage 40 toward the left end of the gondola 20 along the upper edge 30.

Also shown in FIG. 5 is an alternate implement 294 at the end of the one boom 90. According to this embodiment, a magnetized structure 294, such as a plate, is positioned at the end of the at least one boom 90 for moving material to or from the gondola 20.

Figure 6:
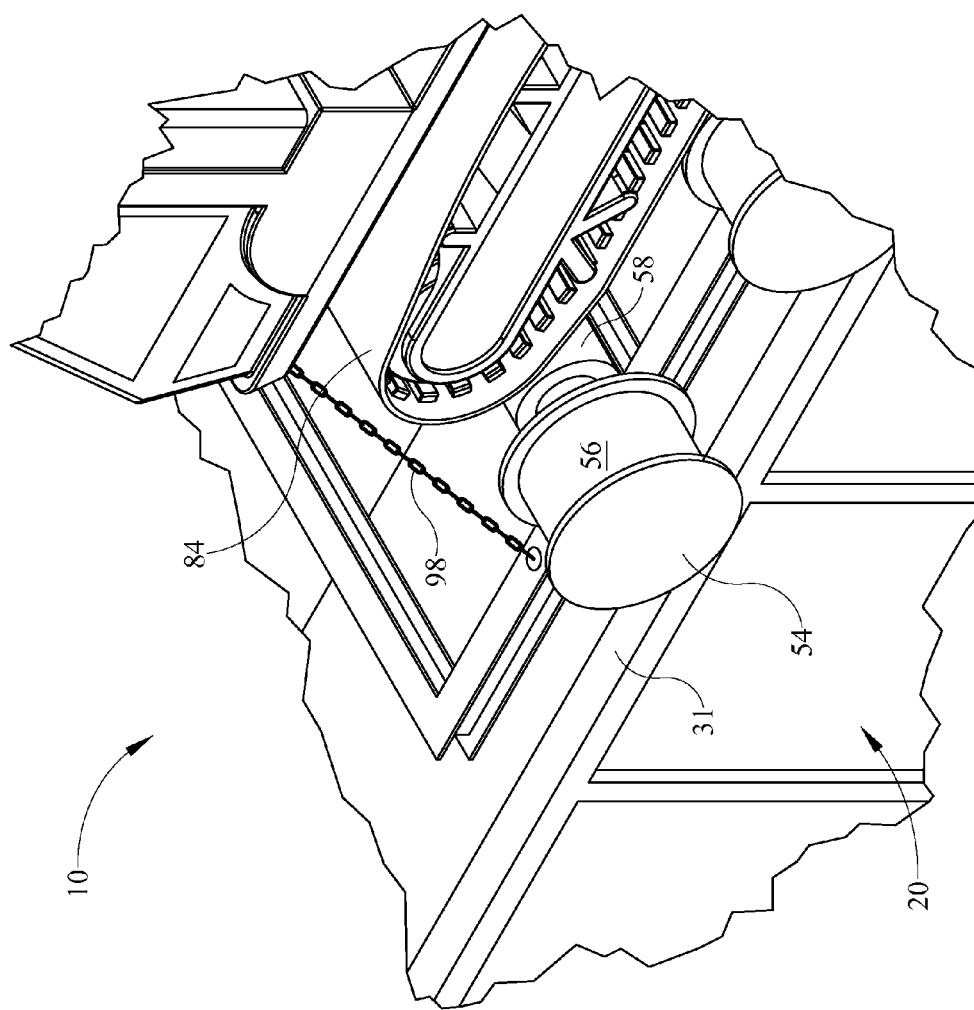
FIG. 6 depicts a detail perspective view of the engagement between carriage wheels and an upper edge of the gondola.

Referring now to FIG. 6, a detailed view of a corner of the gondola carriage assembly 10 is depicted in perspective view. The wheels 54 are shown engaging the upper edge 31 of the gondola 20. The figure also depicts the engagement of the endless track 84 with the track engagement surface 58 recording to this engagement, rotation of the endless track 84 causes rotation of the engagement surface 58 and the wheel 54. The frictional engagement of the surface 56 with the upper edge 31 of the gondola causes movement of the gondola carriage assembly 10 relative to the gondola 20 below.

Referring now to FIG. 7-16, an alternative embodiment of a gondola carriage is depicted wherein the carriage utilizes rotatable and extendable legs to allow movement of the gondola 20 under the carriage. This simplifies movement of the carriage between gondolas.

Figure 7:
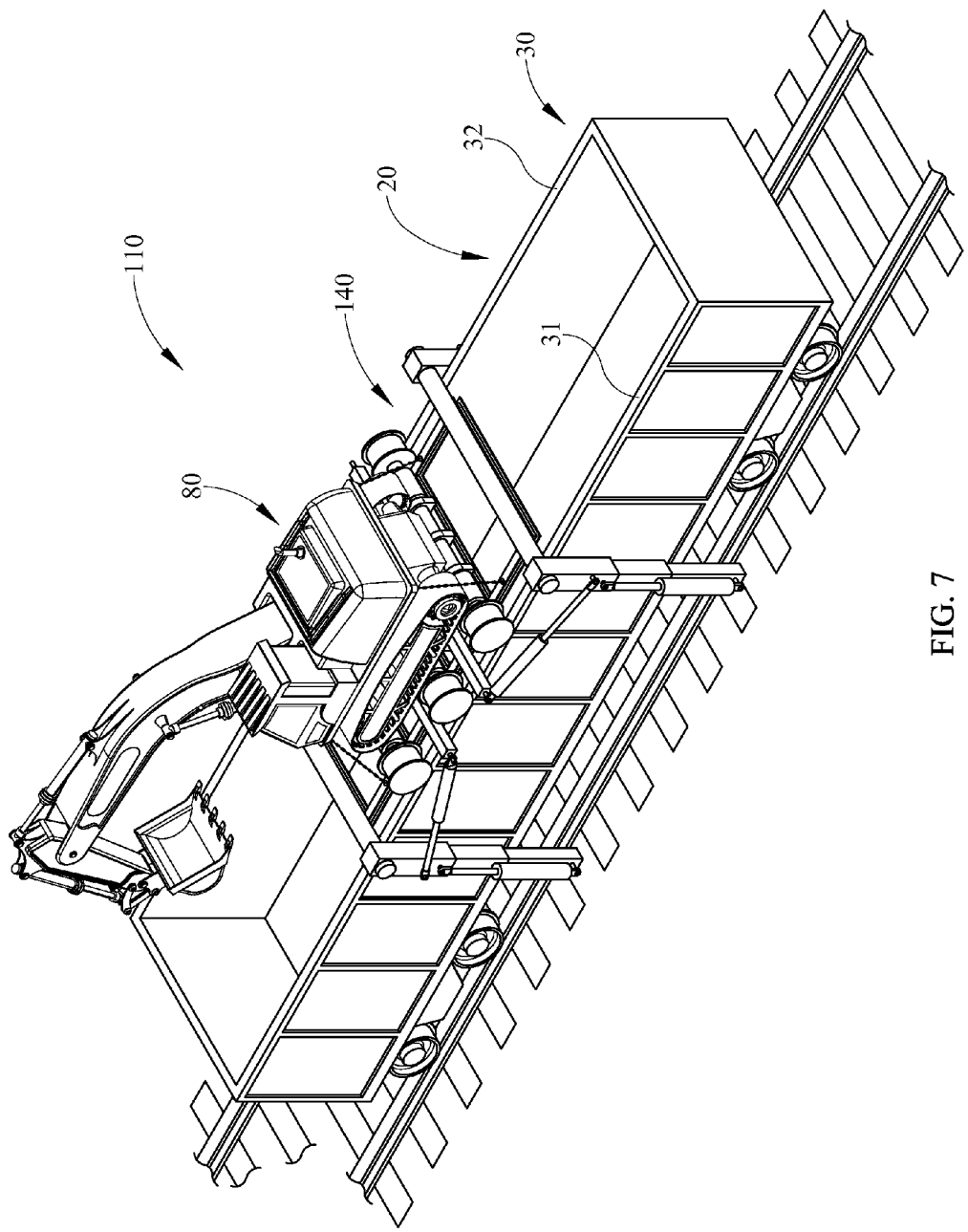
FIG. 7 depicts a perspective view of an alternate embodiment of the gondola carriage.

Referring now to FIG. 7, a perspective view of an alternate embodiment of a gondola carriage is depicted. An assembly 110 includes a gondola 20 having an upper edge 30 defined by at least a first upper edge 31 and a second upper edge 32 which are parallel to each other. The assembly 110 further comprises a loading vehicle 80 disposed on the alternate carriage 140. The alternate carriage 140 differs from the first embodiment, shown in FIGS. 1-6, as the carriage 140 includes a plurality of rotatable and extendable legs connected to the frame structure of the carriage. This provides for ease of loading the carriage 140 and loading vehicle 80 on to a gondola 20. Additionally, the legs allow for ease of movement from a first gondola to a second gondola regardless of height or difference in height of the gondolas 20.

Figure 8:
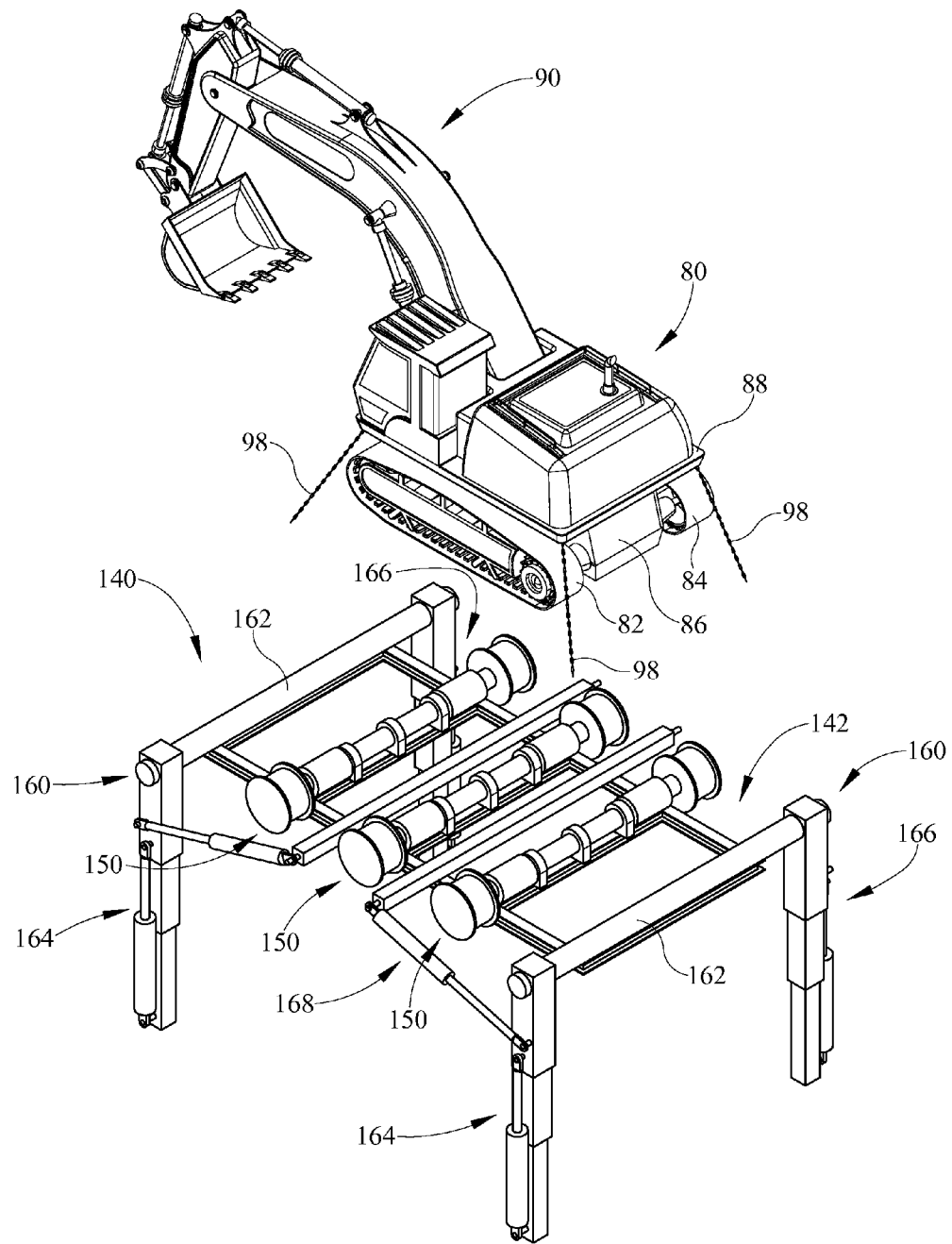
FIG. 8 depicts an perspective view of the alternate embodiment of FIG. 7 with the loading vehicle exploded from the carriage.

Referring now to FIG. 8, an exploded perspective view of the loading vehicle 80 and carriage 140 is depicted. The powered, mobile loading machine 80, as previously described, has chassis 86 to which endless tracks 82, 84 are rotatably connected. A turret 88 is positioned on the chassis, and at least one boom 90 extends from the turret 88. The loading vehicle 80 is generally equivalent to the previously described loading machine, although alternative embodiments may be utilized with the carriage 140.

The carriage 140 includes a frame 142 as previously described and a plurality of axle assemblies 150 disposed on the frame 142. These structures are generally the same or similar to the previously described embodiment. However, the second embodiment of the carriage 140 further comprises at least first and second leg assemblies 160. The forward and rearward leg assemblies 160 are positioned on the carriage frame 142 along an upper surface of the frame 242.

Figure 16:
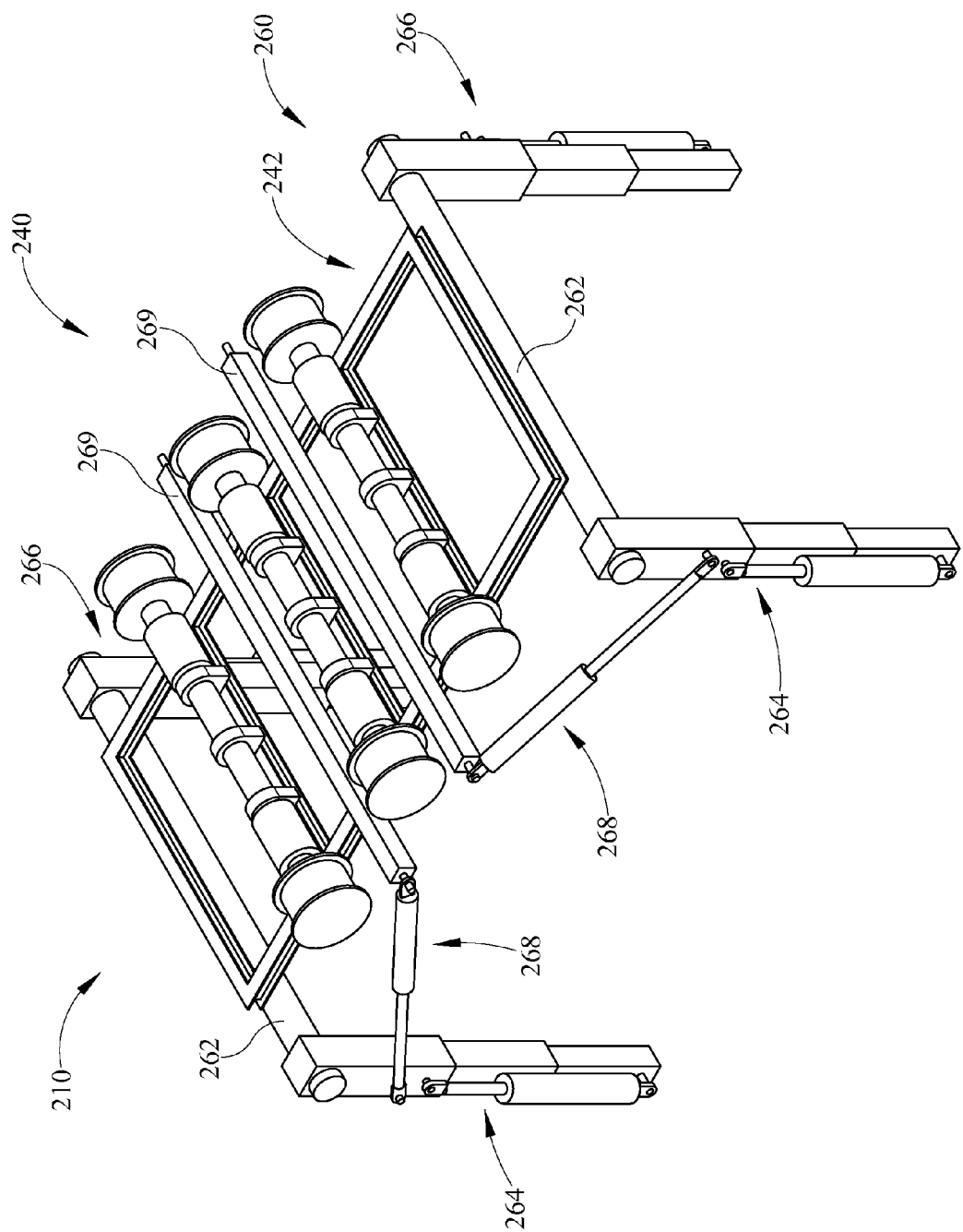
FIG. 16 depicts a perspective view of an alternate gondola carriage having deployable legs positioned on a bottom surface of the frame.

Alternatively, as shown in FIG. 16, the leg assemblies 260 of carriage 240 may alternatively be positioned on a bottom surface of the frame 242. Each leg assembly 260 comprises an axle member 262 which is connected to the frame 242 and first and second legs 264, 266 which are rotatably connected to the axle member 262. The legs 264, 266 are rotatable about the ends of the axle members 262 and are further extendable and contactable. A hydraulic or pneumatic actuator 268 may be connected to a frame member 269 in order to allow for rotation from an upper position to a lower position at which the legs 264, 266 may be extended to engage the ground or substrate beneath the carriage assembly 210. Alternatively, the axle member 262 may be rotatably connected to the frame 242 so that the axle and legs rotate relative to the frame 242.

Figure 9:
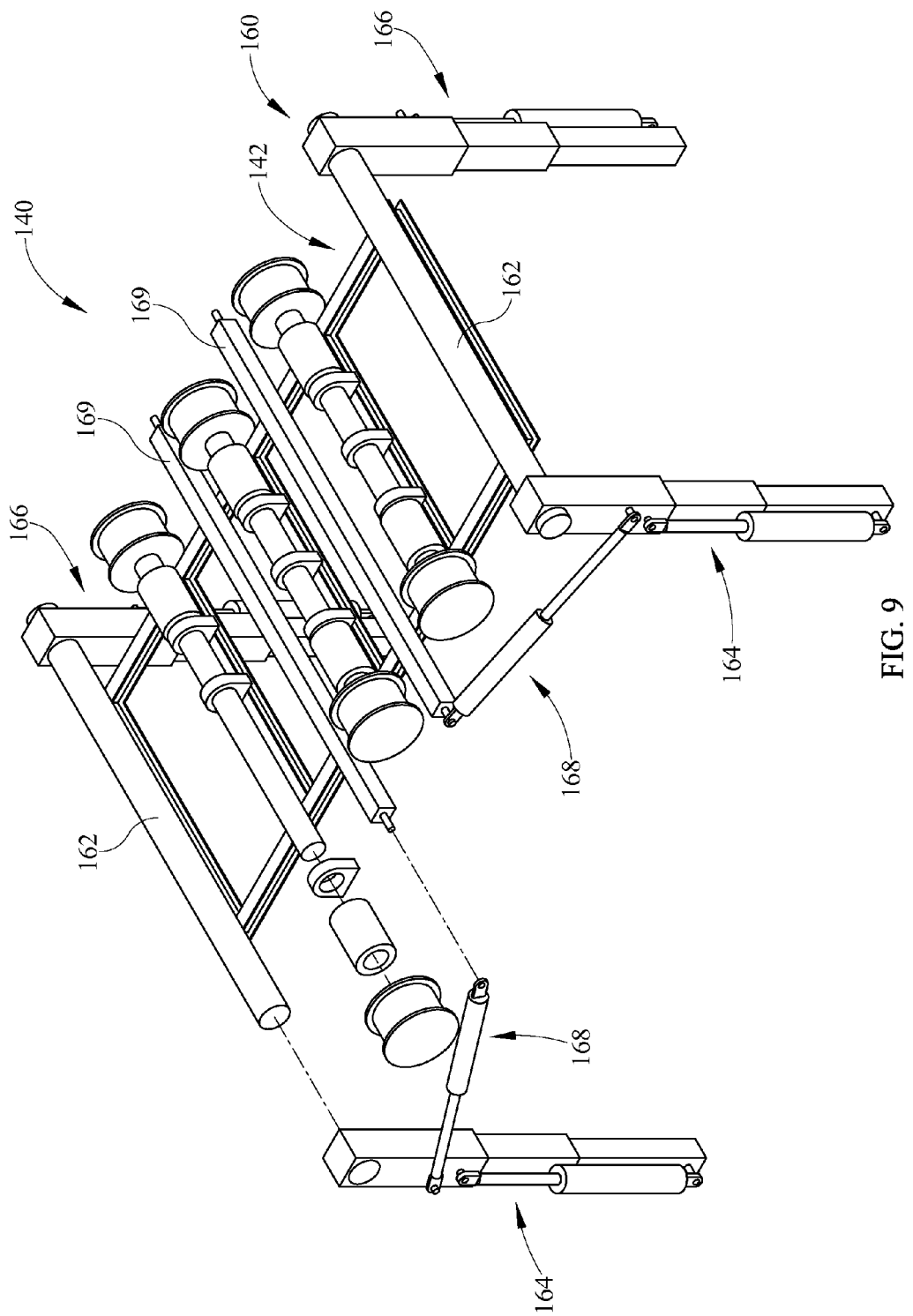
FIG. 9 depicts the alternate gondola carriage of FIG. 8 with the loading vehicle removed and portions of the carriage partially exploded.

Referring to FIG. 9, the carriage 140 is depicted in perspective view with the loading machine or vehicle 80 removed. The leg assembly 160 at one end of the frame 142 is partially exploded. The axle 162 extends outwardly beyond the edges of the longitudinal frame members (44, 46 FIG. 3) and receives the legs 164, 166. These legs can rotate by means of the actuator 1-68 which is connected to a frame member 169. The pivotal connection between the legs 164, 166 and the axles 162 may be provided by various means including bearings, corresponding aperture/axle sizes or other means for allowing pivot of the legs relative to the axles 162. Additionally, the legs 164, 166 may be fashioned in such a manner to slidably extend in the axially direction of the axles 162 from a first inwardly positioned distance apart to a second outwardly spaced distance apart. This may provide for improved operation along the railways when the legs 164, 166 are rotated upwardly and not in use so as to be within the width envelope required for safe operation along a railway.

Figure 10:
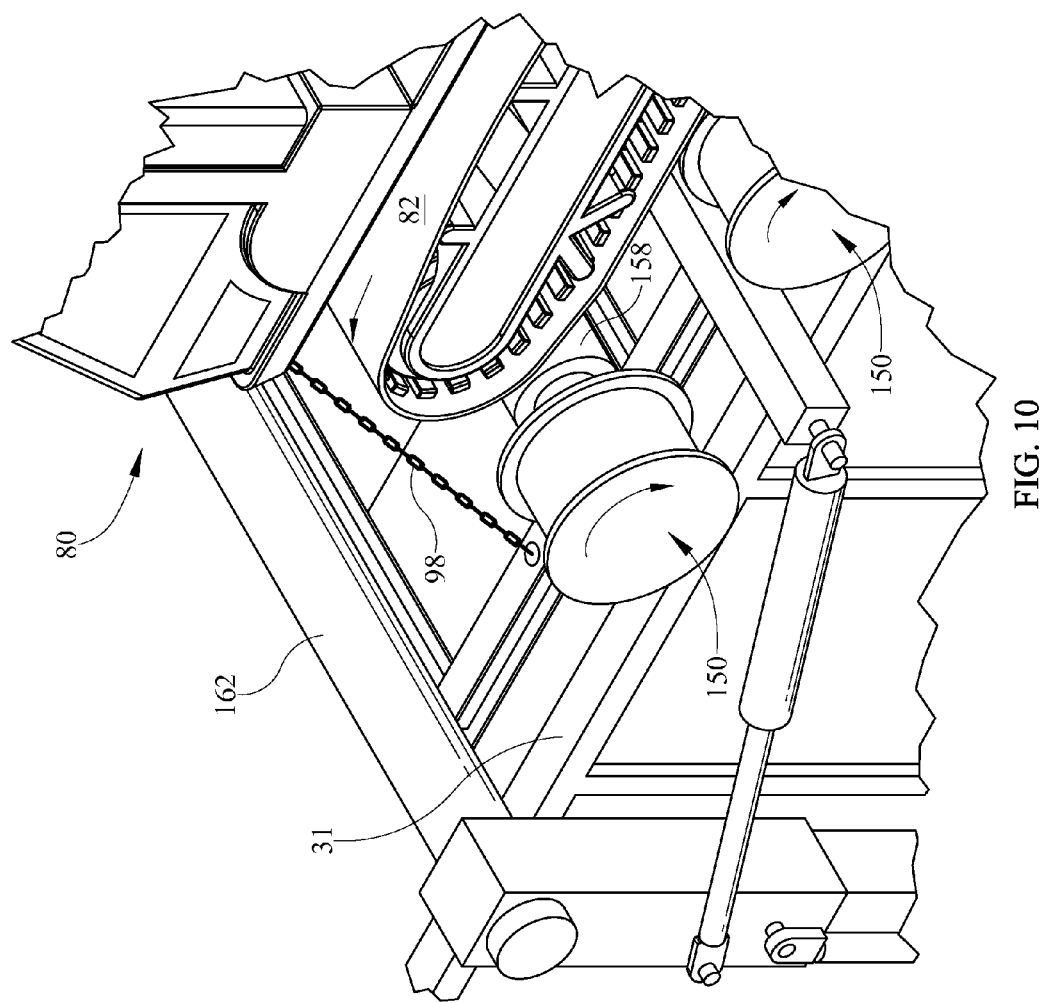
FIG. 10 depicts an alternate detail perspective view of engagement between carriage wheels of FIG. 7 and an upper edge of the gondola.

Referring now to FIG. 10, a detailed perspective view of an end-less track 82 engaging two of the axle assemblies 150 is depicted. The endless track 82 engages an engagement portion 158 causing rotation of the axle assembly 150 disposed on the upper edge 31 of the gondola 20. The connection element 98 extends from the loading vehicle 80 to the frame of the carriage 140, so that the loading vehicle 80 inhibits movement of the loading vehicle 80 relative to the carriage 140. The rotation of the endless track 82 indicated by rotational arrow results in a second rotation by the axle assemblies indicted by rotational arrow as well.

Figure 11:
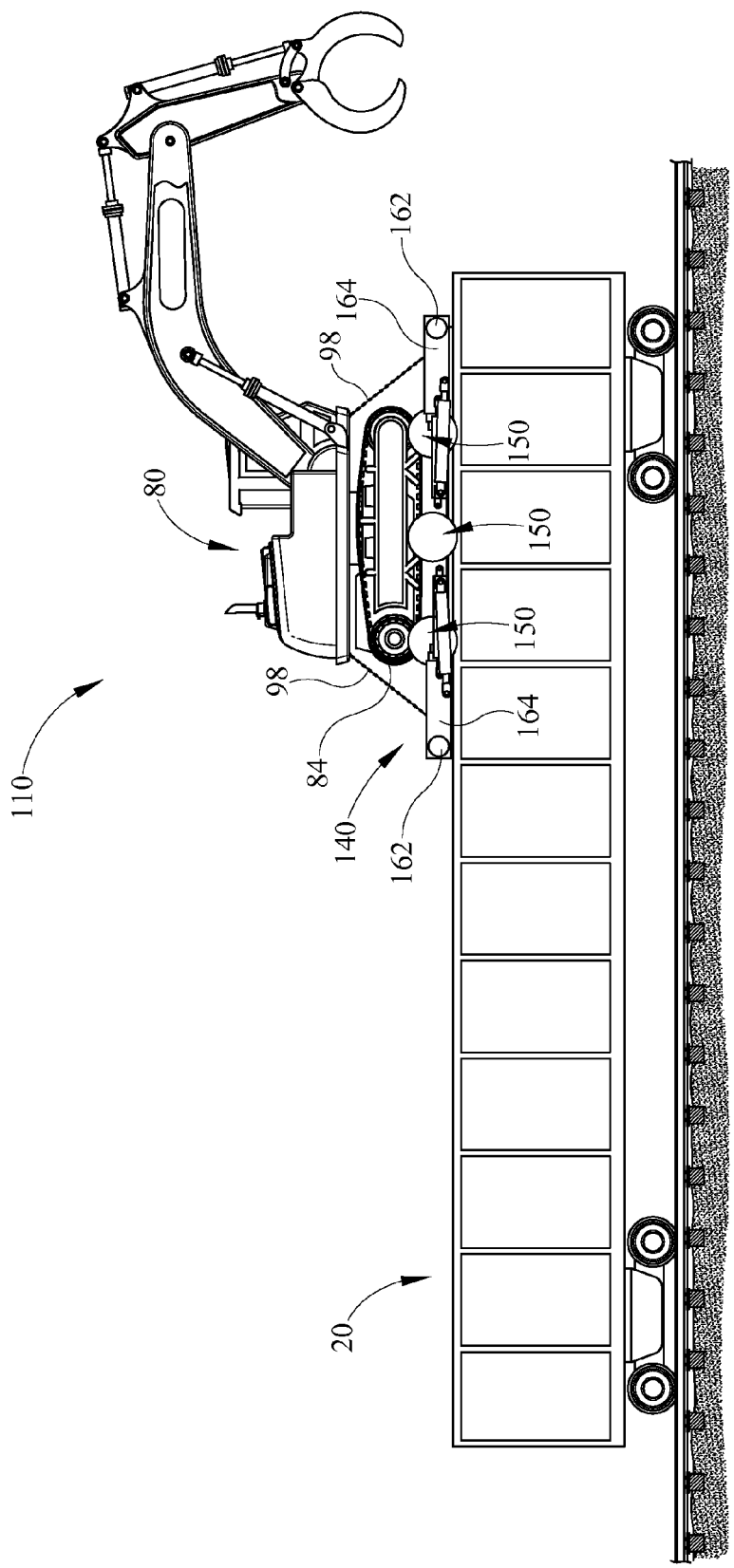
FIG. 11 depicts a side view of the gondola carriage in operation at a first position relative to the gondola.

Referring now to FIG. 11, the gondola carriage assembly 110 is depicted in side view. The carriage and loading vehicle 80 are depicted at the right-hand end of the gondola 20. In this view, the legs 164, 166 (FIG. 8) are rotated about the axles 162 to a horizontal upper position, so as not to interfere with the gondola or not to extend and engage the ground or substrate beneath the carriage 140. From this position, the loading vehicle 80 may operate the at least one boom to either clean out the gondola 20 or load contents from the railway into the gondola 20. As the endless tracks 84 rotate, the axle assemblies 150 each rotate to drive the loading vehicle 80 and the gondola carriage 140 as a single unit along the upper edge of gondola 20 according to the previously described manner.

Figure 12:
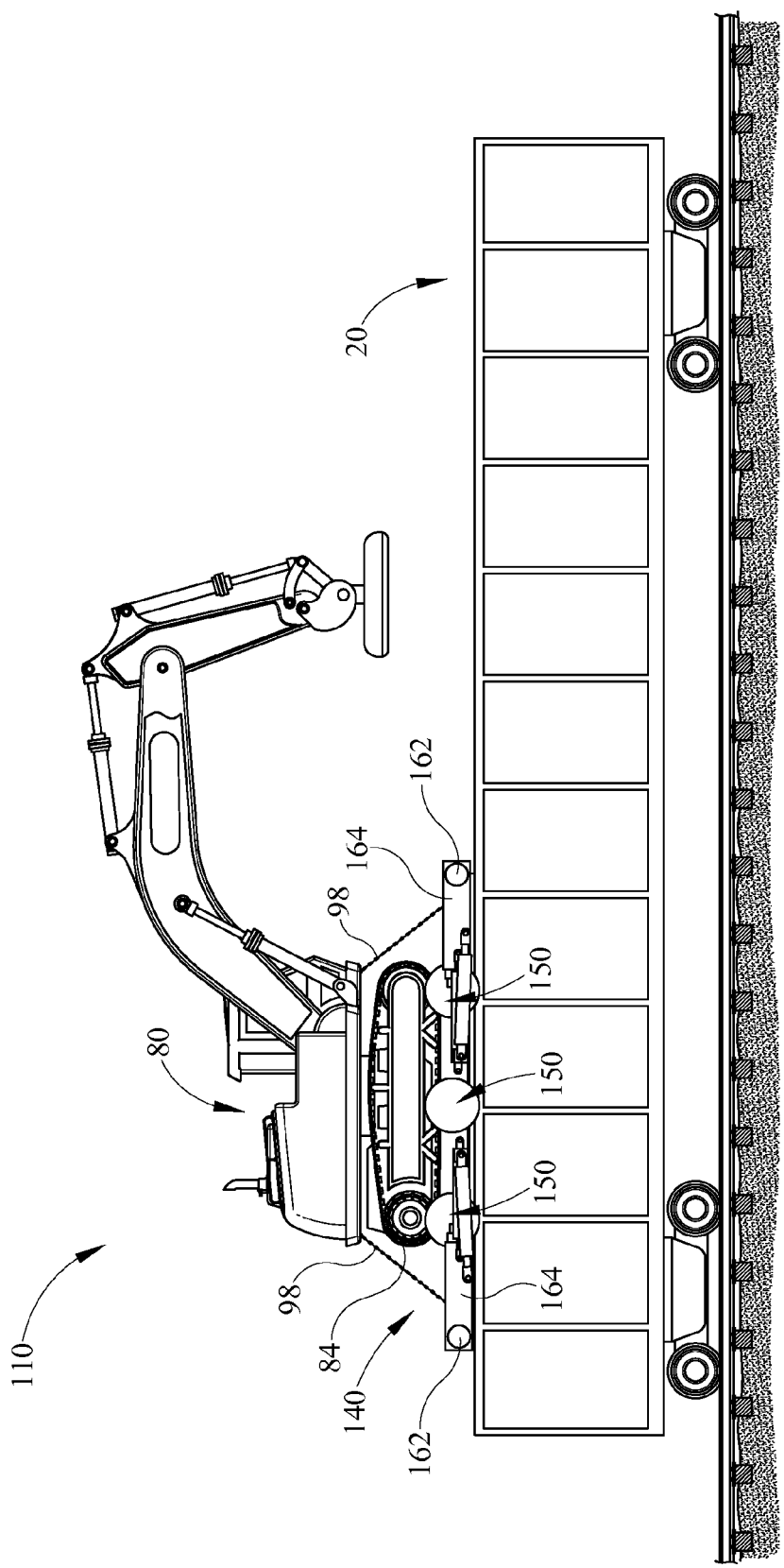
FIG. 12 depicts a side view of the gondola carriage in operation at a second position relative to the gondola.

Referring now to FIG. 12, a side view similar to that of FIG. 11 is depicted with the carriage 140 and the loading vehicle 80 moved to the left-hand side of the gondola as opposed to FIG. 11. As previously described, this movement occurs by operation of the endless tracks 82, 84 on the carriage to drive the axle assemblies 150 to cause movement of the loading vehicle 80 and carriage 140 as a single unit relative to the gondola upper edge.

Figure 13:
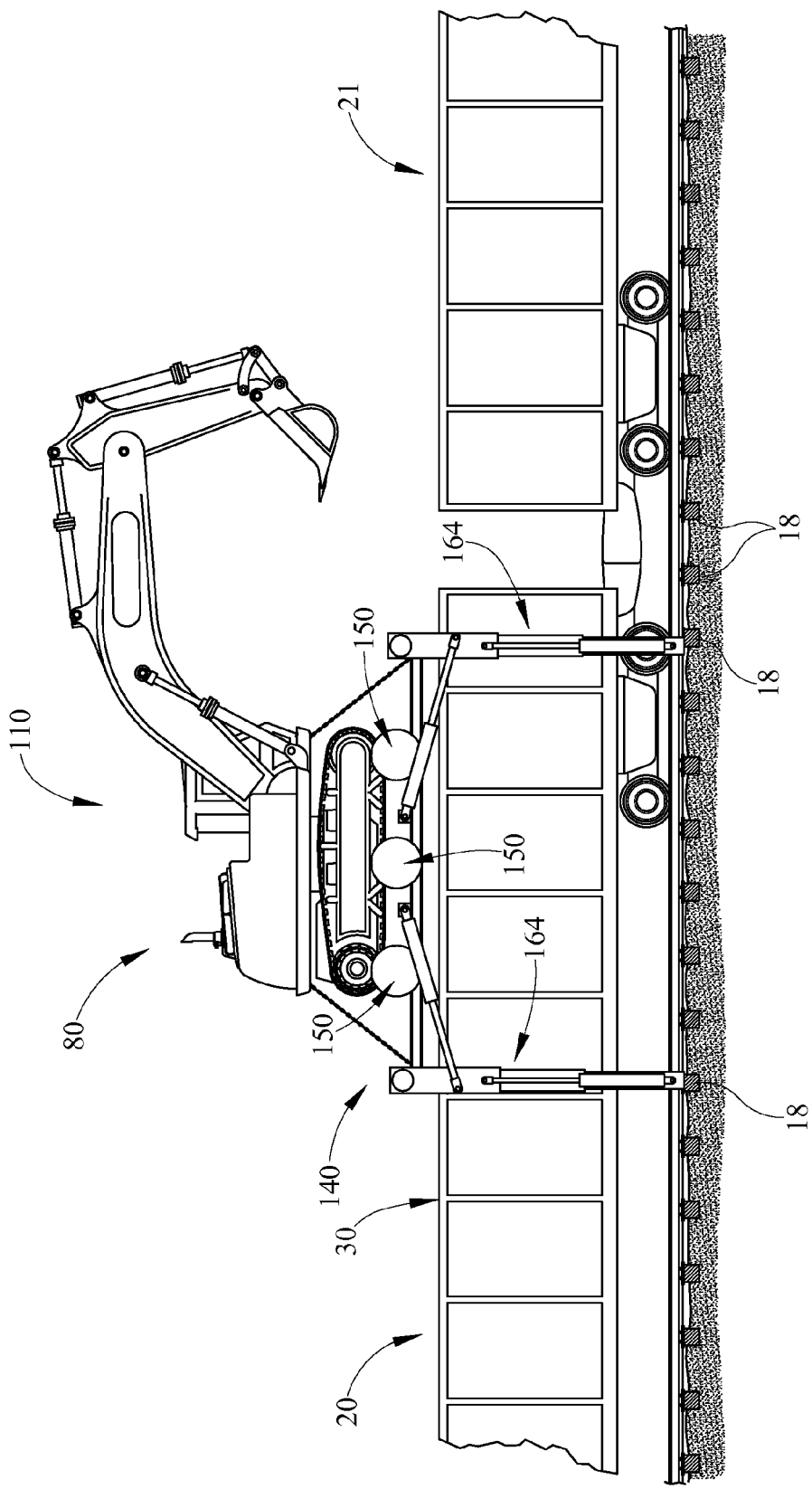
FIG. 13 depicts a side view of the gondola carriage in with legs deployed to transfer from one gondola to a second gondola.
Figure 14:
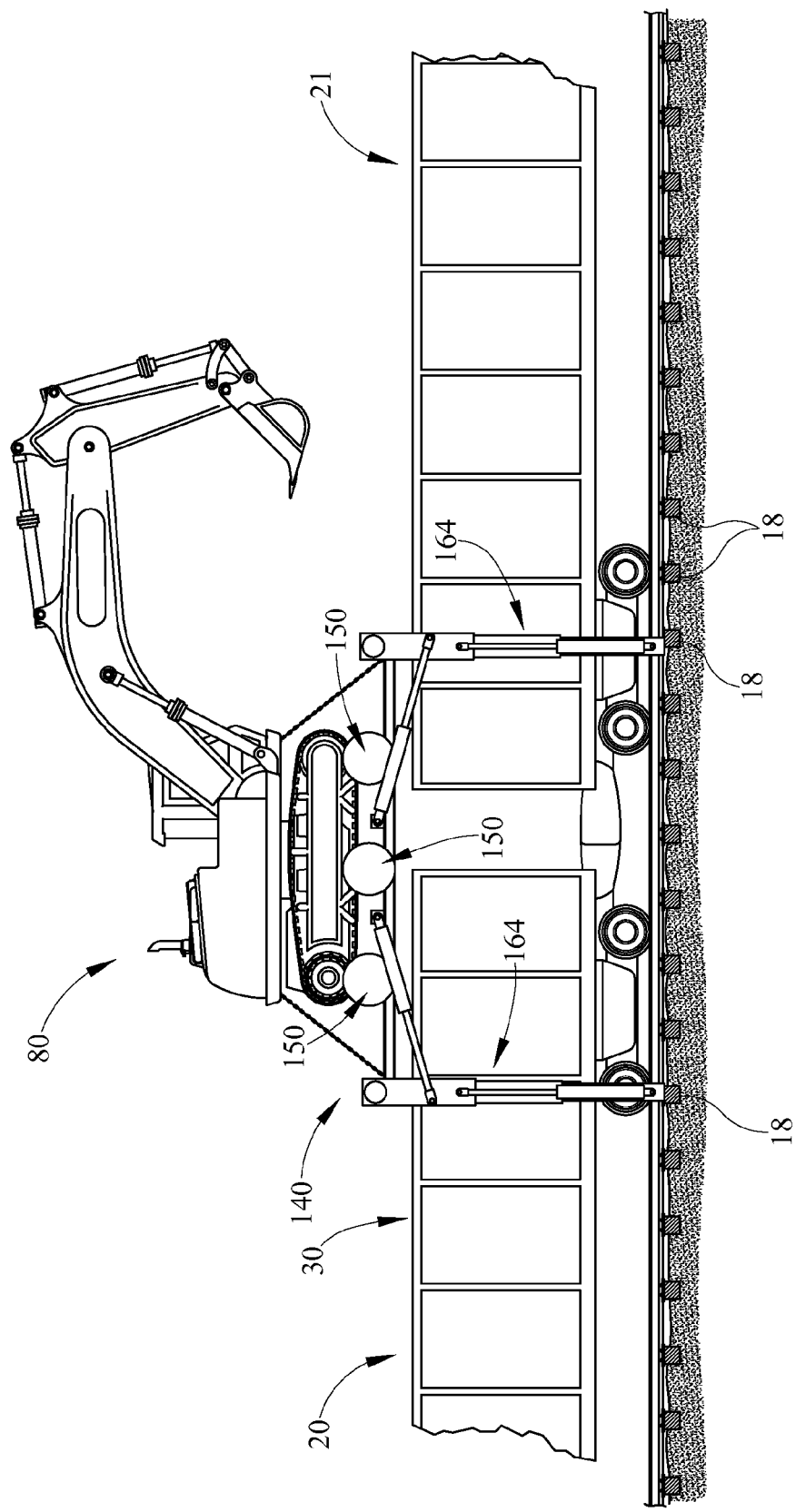
FIG. 14 depicts a side view of the gondola carriage elevated to move from one gondola to a second gondola.

Referring now to FIG. 13, a side view of the gondola carriage assembly 110 is depicted including the carriage 140 and loading vehicle 80. In the drawing a first gondola 20 is disposed beneath the carriage 140 and the loading vehicle 80. Adjacent to the first gondola 20 is a second gondola 21. The leg assemblies 160 are rotated downwardly and engaging railroad ties 18. Alternatively, the legs may be extended downwardly to engage the substrate adjacent to or beneath the railroad ties 18. With the legs 164, 166 in an extended position, the carriage frame 142 is raised about the upper edge of the first gondola 20, so that the axle assemblies 150 do not engage the upper edge of the gondola 20. With the carriage 140 and loading vehicle 80 raised above the uppermost edge 30 of the gondola 20, the first gondola 20 may be moved beneath the assembly 110 and the second gondola 120 moved to a position beneath the carriage 140. This movement is shown taking place in FIG. 14 as the gondolas 20, 21 move in a left-hand direction.

Figure 15:
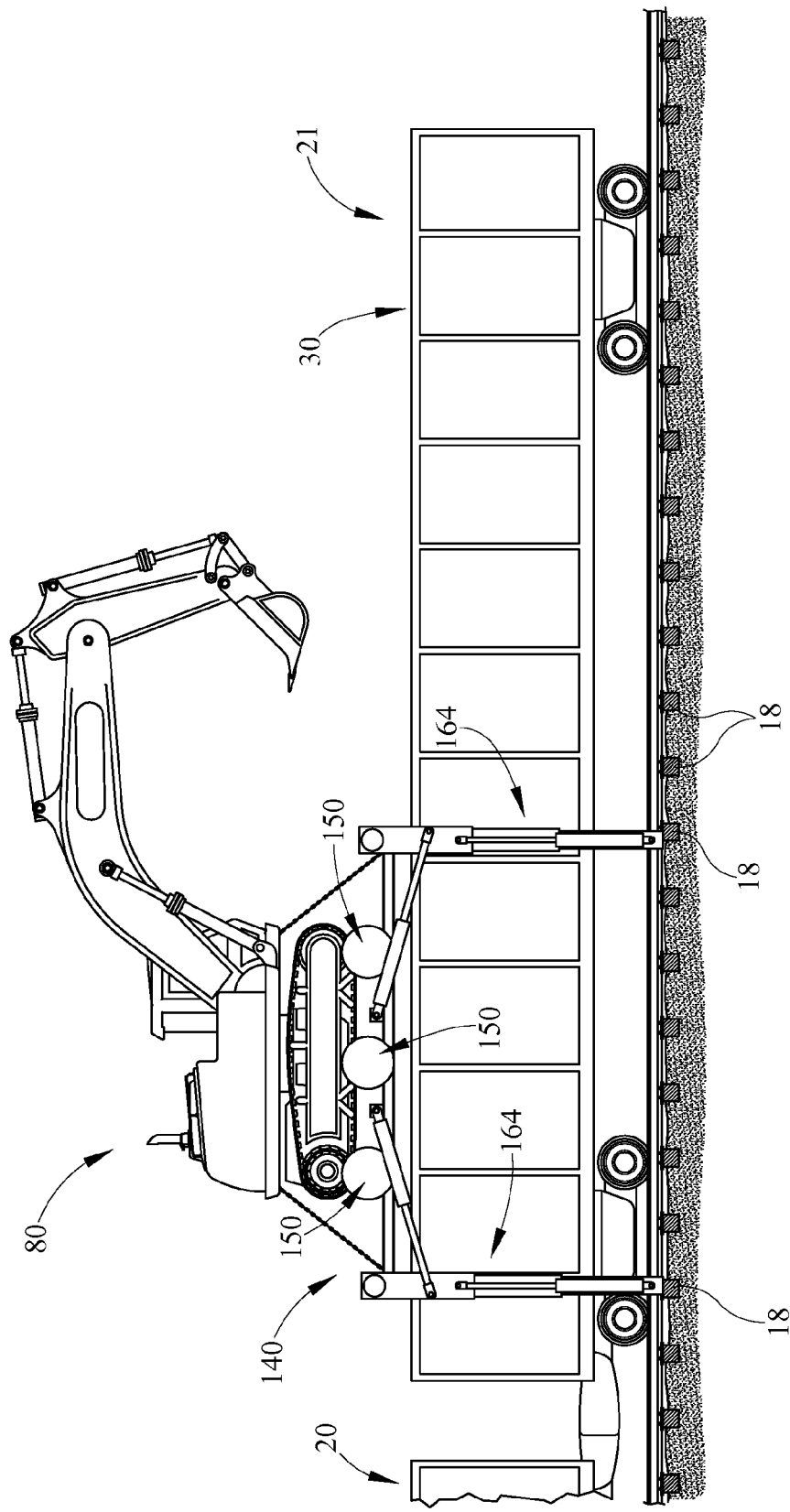
FIG. 15 depicts a side view of the gondola carriage positioned on the second gondola prior to operation.

Referring now to FIG. 15, the second gondola 21 is positioned beneath the gondola carriage assembly 110. With the carriage 140 positioned fully over the second gondola 21, the legs 164, 166 may be retracted so that the carriage 140 is lowered and the axle assemblies 150 engage the upper edge 30 of the second gondola 21. As a result, the carriage 140 may now operate by rotation of the endless tracks 82, 84 of the loading vehicle 80 to move along the upper edge of the second gondola 21. Additionally, the legs 164, 166 may be rotated to an upper position, shown in FIGS. 11 and 12, for operation of the carriage 140 along the upper edge of the gondola 21.

Figure 17:
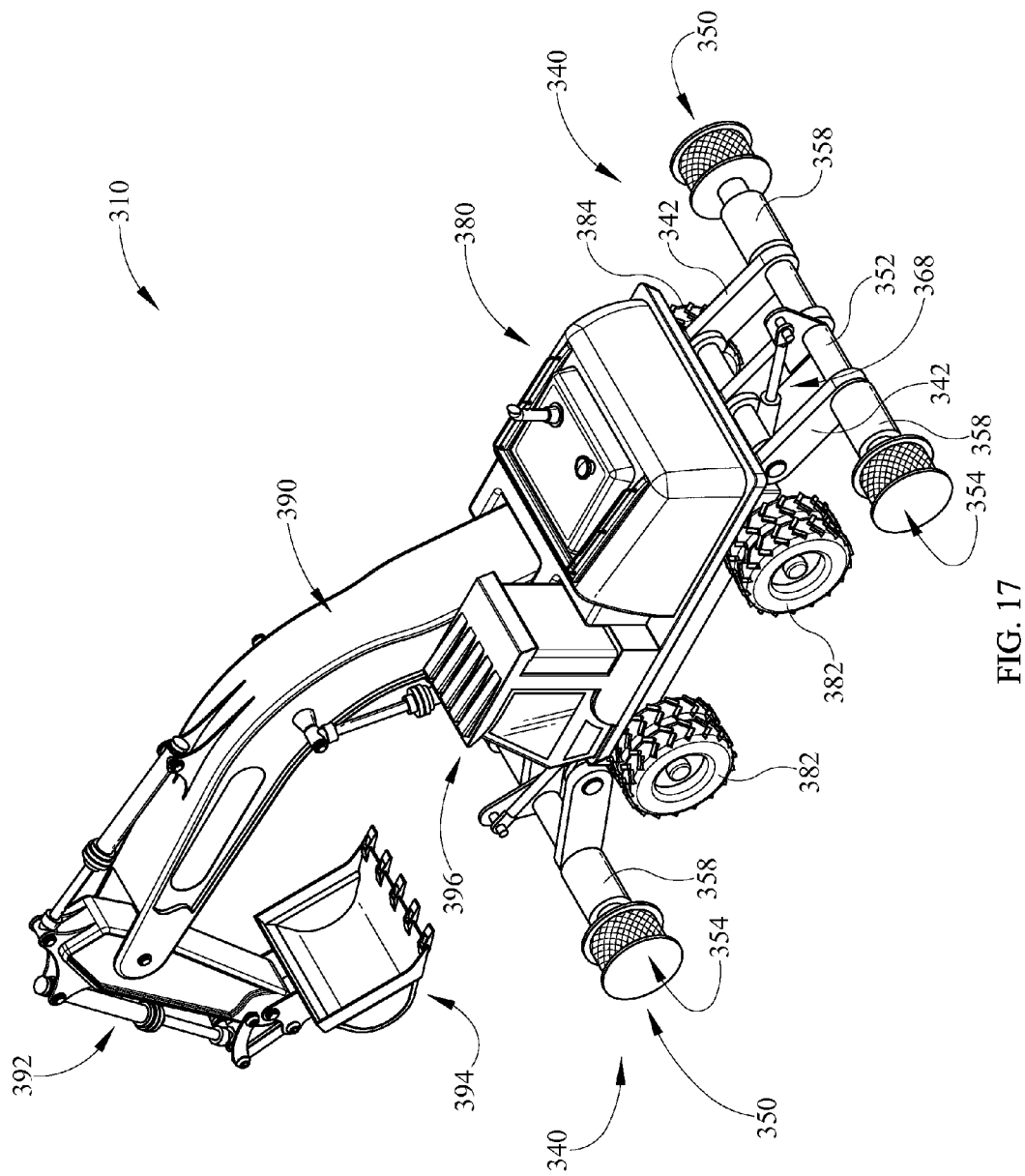
FIG. 17 depicts a perspective view of an alternate gondola carriage assembly in a first position.
Figure 18:
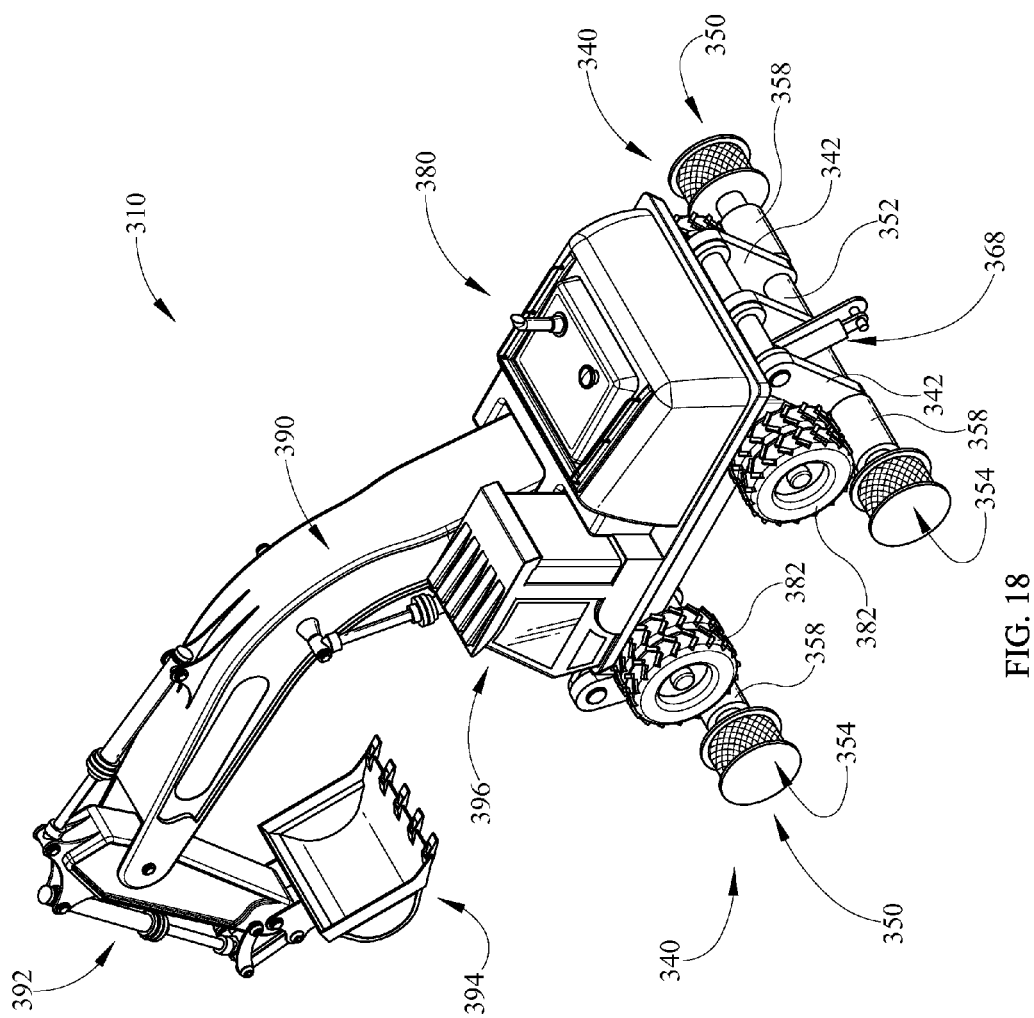
FIG. 18 depicts a perspective view of the alternate gondola carriage assembly of FIG. 17 in a second position.

Referring now to FIGS. 17 and 18, a further alternative embodiment of a gondola carriage assembly 310 is depicted. According to this embodiment, a separate carriage assembly is not utilized but instead the carriage structure which makes operation along the gondola edges possible is integrated into the structure of the mobile, powered loading vehicle 380, such as a backhoe, excavator or mini-loader, for example.

Referring to initially to FIG. 17, a gondola carriage assembly 310 is depicted in perspective view having a carriage portion 340 at a front and at a rear of the powered, mobile loading vehicle 380. The vehicle has a chassis, a cab 396, a power source generally hidden but represented by an exhaust stack and at least one boom 390. The at least one boom 390 includes an articulating second portion 392 and a bucket or other loading implement 394 which may be utilized to load or unload railroad track material from or into a gondola 20. The lower portion of the vehicle 380 includes tires at the four corners of the chassis. At a forward and rear portion of the chassis is at least one forward arm and at least one rear forward arm 342, respectively. According to the exemplary embodiment, three arms 342 are utilized at each end of the vehicle. The arms 342 are pivotally connected to the chassis at a first end and retain a gondola axle assembly 350. According to the instant embodiment, the gondola axle assembly 350 includes an axle 352 and gondola wheels 354 at each end of the assembly. The axle 352 may pivot within the arms 342, or alternatively the wheels 354 may pivot relative to the axle 352. The axle 352 further includes engagement portions 358 which engage tires 382, 384.

The carriage assemblies 340 are integrated with the chassis of the vehicle 310 but may alternatively be removable. The carriage assemblies 340 each comprise at least one actuator 368 which raises and lowers the axle assemblies 350. The actuator 368 may be connected to a plate, gusset or the like, or alternatively may be directly connected to the axle assembly or arm 342 for raising or lowering the assembly 350. The carriage assemblies 340 are shown in a first position which does not interfere with over-the-road travel and so that the gondola wheels 354 do not engage or touch the ground or substrate beneath the vehicle 310. However, as shown in FIG. 18, the carriage assemblies 340 are pivoted to a second position wherein the tires 382, 384 of the vehicle 310 engage portions 358 of the axle 352 in order to rotate the gondola wheels 354. Thus, upon rotation of the vehicle tires 382, 384, the gondola wheel assemblies 350 rotate and drive gondola wheel assemblies 354 along edges of a gondola. The wheel assemblies 354 include an inner surface which may be knurled or covered in a gripping material which may be rubber, metal or other known materials in order to enhance traction of the vehicle 310 along the upper edges of the gondola 20 (FIG. 1). As an additional alternative, the vehicle 310 may include tracks instead of tire and wheels in order to engage the carriage assemblies 340 at the front and rear of the vehicle 380 and cause rotation of at least a portion of the gondola wheel assembly 350.

Figure 19:
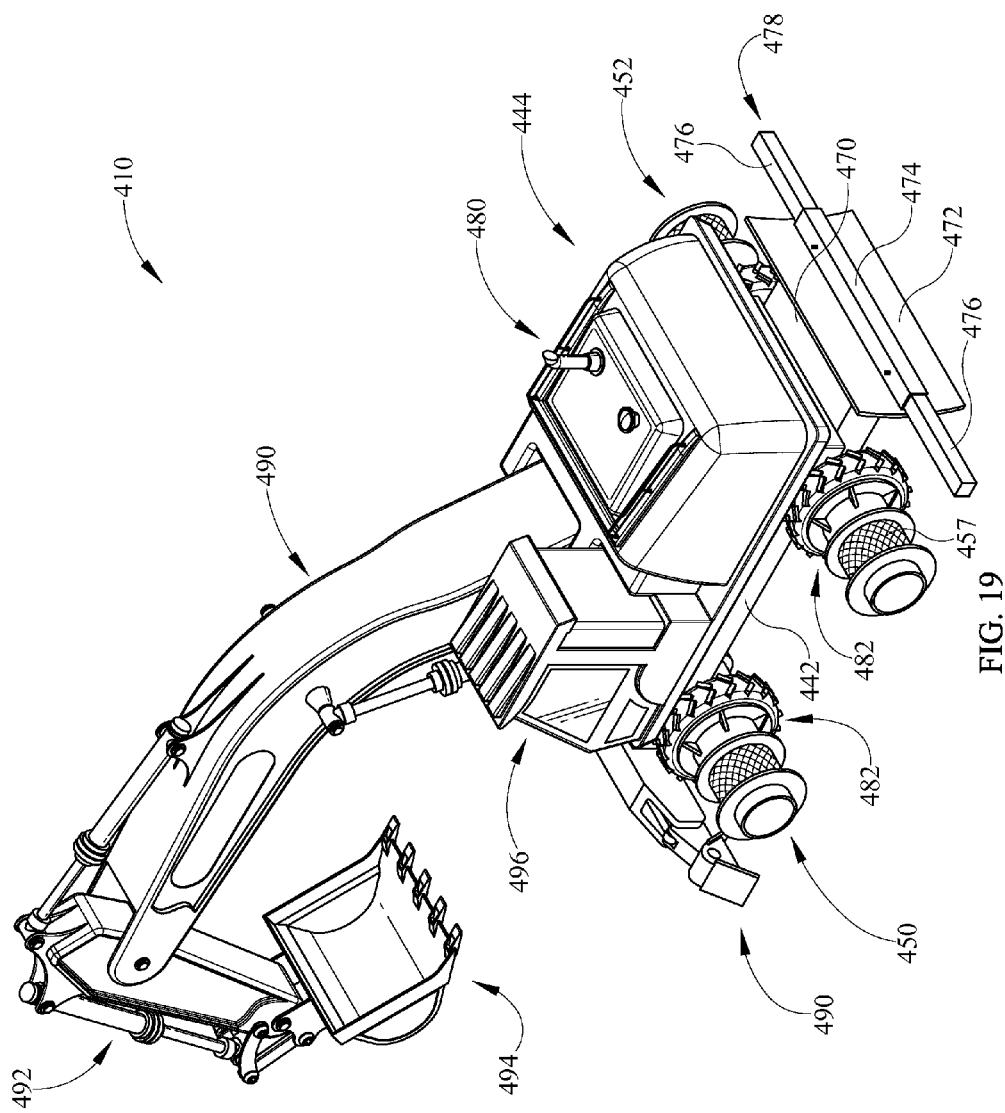
FIG. 19 depicts a perspective view of an alternative gondola carriage assembly.

Referring now to FIG. 19, an alternate gondola carriage assembly 410 is depicted. As with the previous embodiment, the term carriage assembly should not be limited to a separate structure but instead may be considered as built-in or integrated with the mobile, powered loading vehicle such as, for example, a backhoe, an excavator, a mini-loader or the like. According to the exemplary embodiment, a mobile, powered vehicle 480 utilizing the existing powered axles to drive a plurality of axle assemblies 450, 452, including gondola wheel assemblies 451 which engage an upper edge of the gondola. The carriage assembly 410 includes a power source disposed on a chassis 442. The excavator or other powered loading vehicle 480 has an upper portion and a lower portion, wherein the upper portion 444 is pivotally connected to the frame or chassis 442. The powered vehicle 480 includes at least one boom portion 490 and may include a second articulating portion 492 which is pivotally connected to the first boom portion 490. Additionally, the structure may have a bucket 494 or other loading implement which is utilized to pick up elements of the railroad track material within a gondola 20. On the upper portion of the frame 442 is the cab 496, the power source generally indicated by the exhaust stack and the at least one boom 490. Depending from the chassis 442 are axle assemblies 450 and rear axle assemblies 452. Each of the axle assemblies 450, 452 includes a left side and right side gondola wheel assemblies 451. The gondola wheel assemblies are generally constructed in a similar manner and therefore a single wheel assembly will be described.

Figure 21:
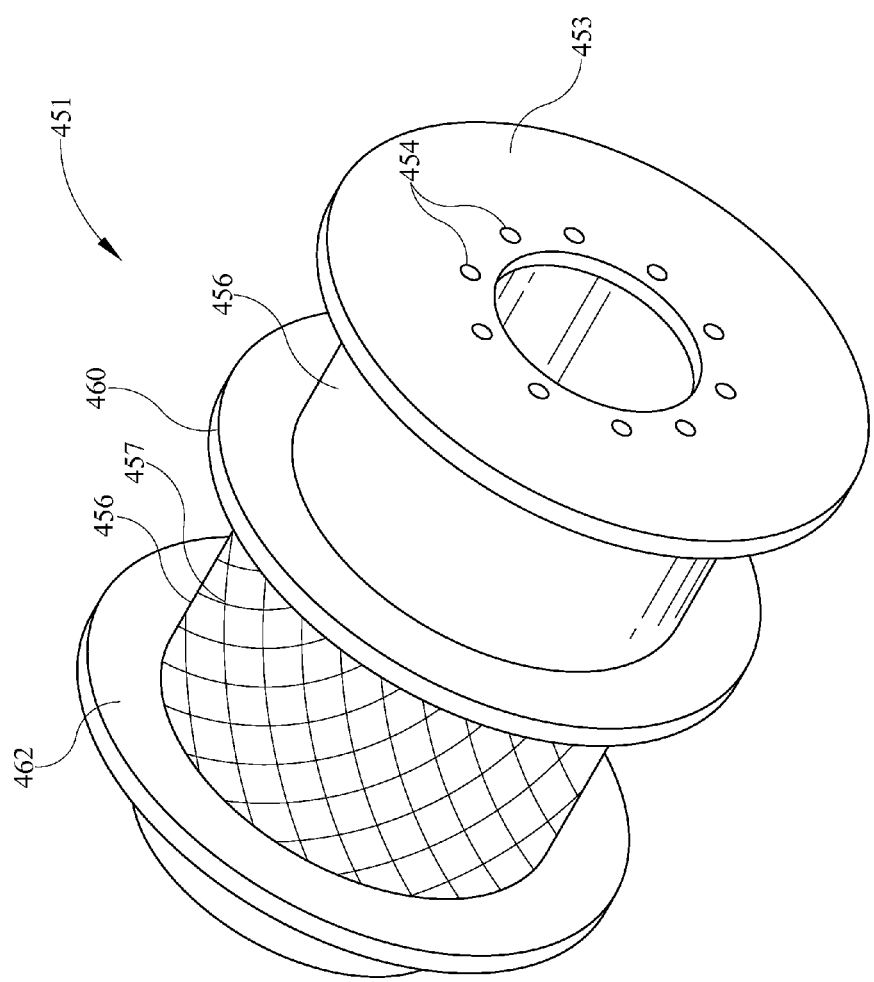
FIG. 21 depicts a perspective view of the wheel assembly of the vehicle of FIG. 19.

Referring now to FIG. 21, an exemplary gondola wheel assembly 451 is shown. The wheel assembly includes an innermost wheel flange 453 with a bolt pattern 454 allowing connection of the flange 453 to an existing tire assembly 482, 484 of the powered vehicle 480. The wheel flange or connection flange 453 has a central aperture allowing positioning of any existing axle structure extending from the powered vehicle 480. The flange 453 includes an innermost side which is shown and an opposite face from which a hub 456 extends. The hub 456 is generally cylindrical in shape and extends in a direction which is coaxial with the central aperture of flange 453. Hub 456 extends between the innermost wheel flange 453 and an inner gondola flange 460. The flange 460 is generally circular in shape receiving the hub 456 on a first side and extending from the opposite side as well. The hub 456 extending from the inner gondola flange 460 and opposite the wheel flange 462 may additionally be knurled or otherwise textured to enhance grip. Alternatively, an additional structure may be supplemented or overlay the hub 456 to enhance traction. This surface 457 engages an upper edge 30 of the gondola 20. This grip aiding surface 457 enhances traction of the wheel assemblies 451. Disposed on the opposite end of the hub 456 from the flange 453 is an outer gondola flange 462. The outer gondola flange 462 and the inner gondola flange 460 provide bounds within which an edge of the gondola may be positioned and engage the grip aiding surface 457 of hub 456. The flanges additionally provide a means of maintaining the gondola assembly 410 on the gondola 20. The outermost edge of the gondola flange 462 is shown as flat. However, the edge may also be curved in order to aid with positioning of the gondola and guiding the gondola wheel assembly 451 along the edge of the gondola 30.

Figure 22:
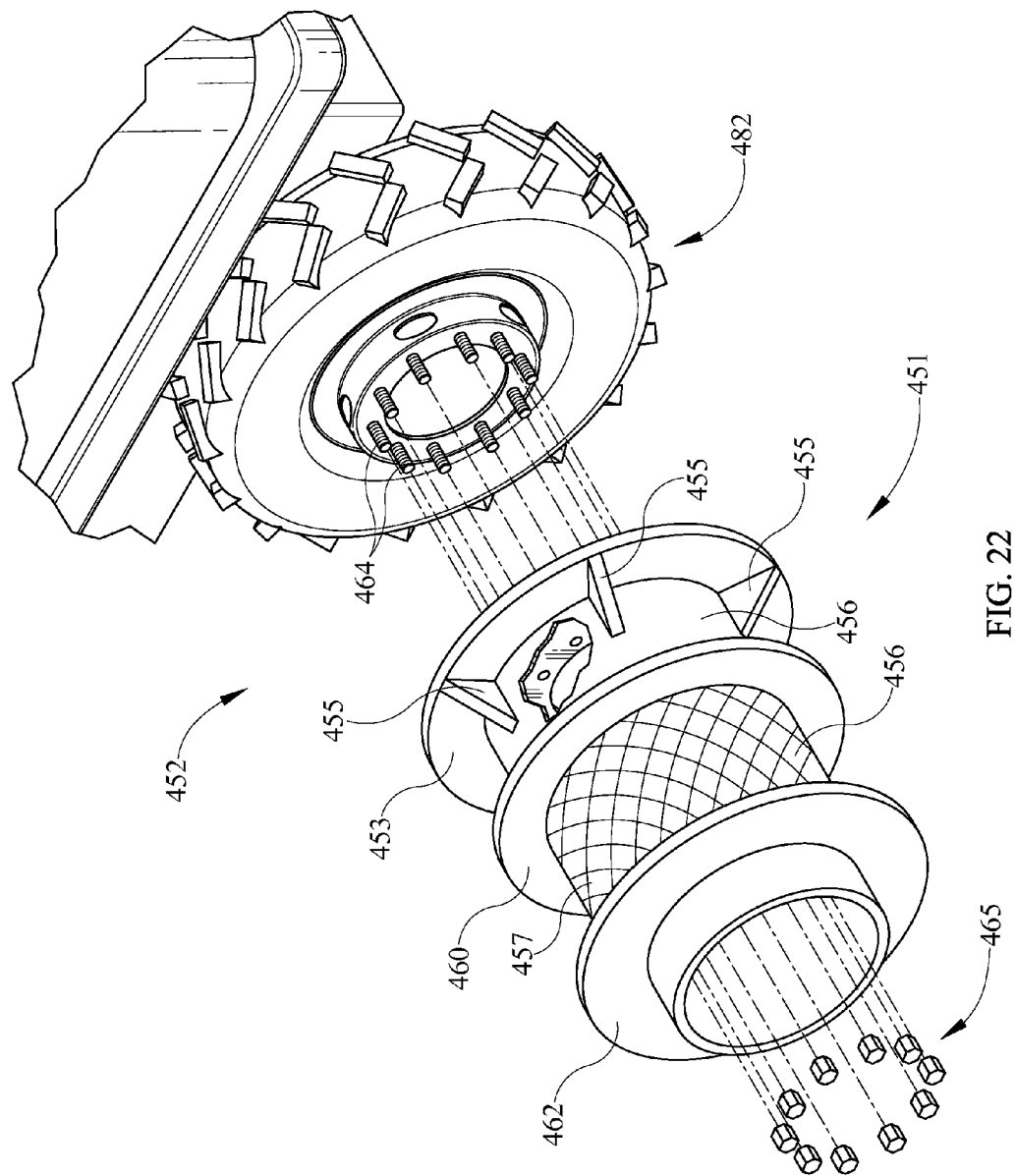
FIG. 22 depicts an exploded perspective view of a wheel assembly of the vehicle of FIG. 19; and, FIG. 23 depicts an exploded perspective view of an alternative wheel assembly.

Referring now to FIG. 22, an exploded view of a wheel assembly 450 is shown in perspective view. The flange 453 is depicted from an opposite angle as that of FIG. 21 so that a plurality of braces 455 which are used to connect the flange 453 to the hub 456. The hub 456 is cylindrical and hollow and threaded studs or bolts 464 are positioned extending from behind and through the tire assembly 482 toward the gondola wheel assembly 451. Apertures 454 are aligned with the bolts 464 and the gondola wheel assembly is mounted on the studs 464. Nuts 465 may be positioned through the hollow hub 456 to tighten the gondola wheel assembly 451 against the tire assembly 482 and the remaining structure of the mobile, powered loading vehicle 410.

Figure 23:
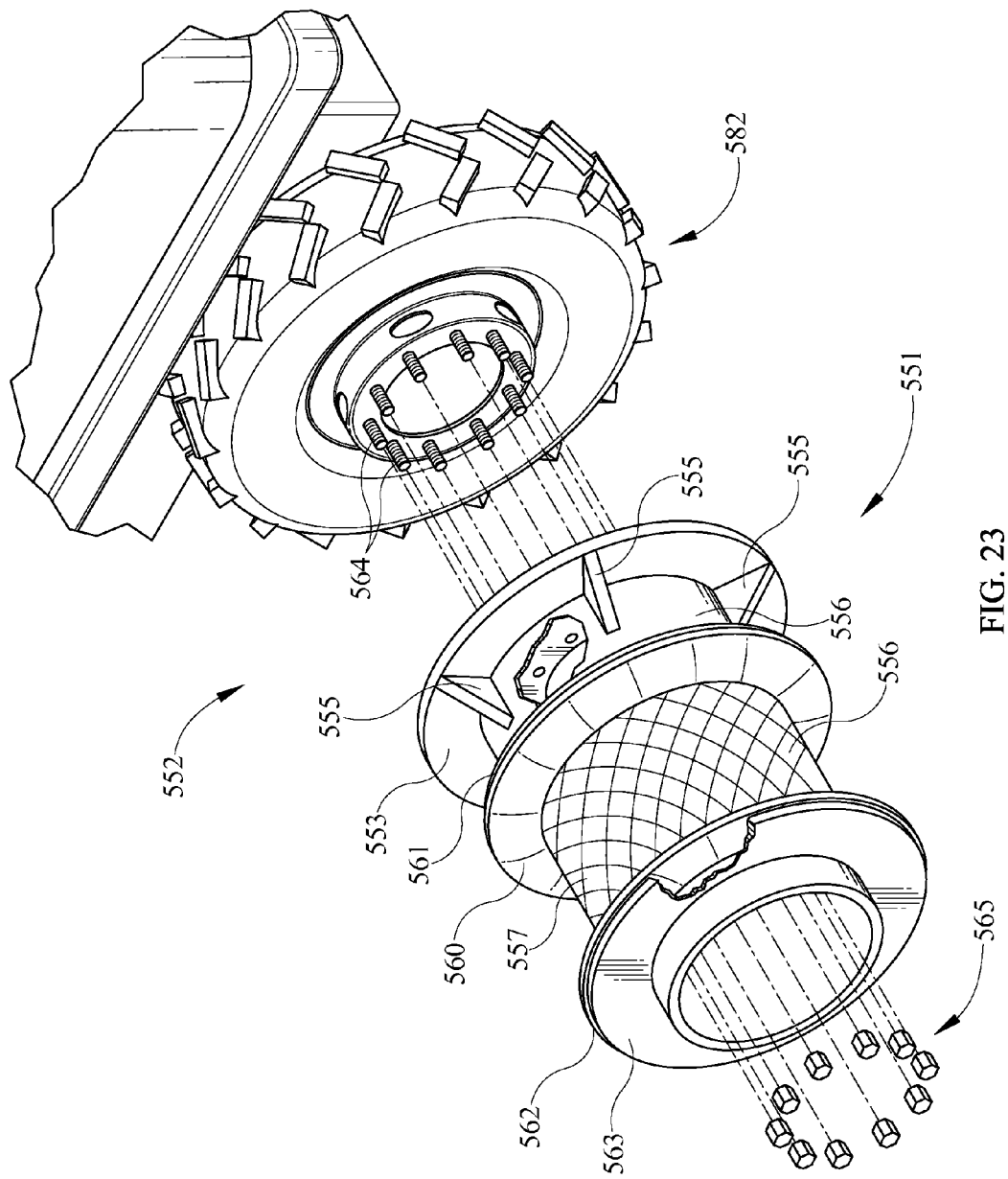

Referring now to FIG. 23, an alternate gondola wheel assembly 551 and a tire assembly 582 are depicted in perspective view defining a portion of the axle assembly 552. The wheel assembly 552 as with previous embodiments may include flanges 553 with braces 555. These structures are connected to the hub 556. The assembly 551 also includes surface 557 to engage the gondola edge. The wheel assembly 551 is connected by nuts 565 to the lugs 564. In the alternate embodiment, flanges 560 and 562 are curved near their respective radial outer edges. This curvature aids in centering the gondola carriage assembly on the upper gondola edges. Alternatively, the flanges 460, 462 (FIG. 22) may be formed in a generally frusto-conical form, rather than vertical or curved, so that the angled or tapered surface also functions to aid the positioning of the gondola wheel 451 on the upper edge of the gondola rail. Additionally, adjacent each of the flanges 560, 562 are strengthening or support flanges 561, 563, respectively. These support flanges 561,563 may be welded to the flanges 560, 562 to limit the bending or curvature beyond an amount that may damage the gondola wheel assembly 551.

Figure 20:
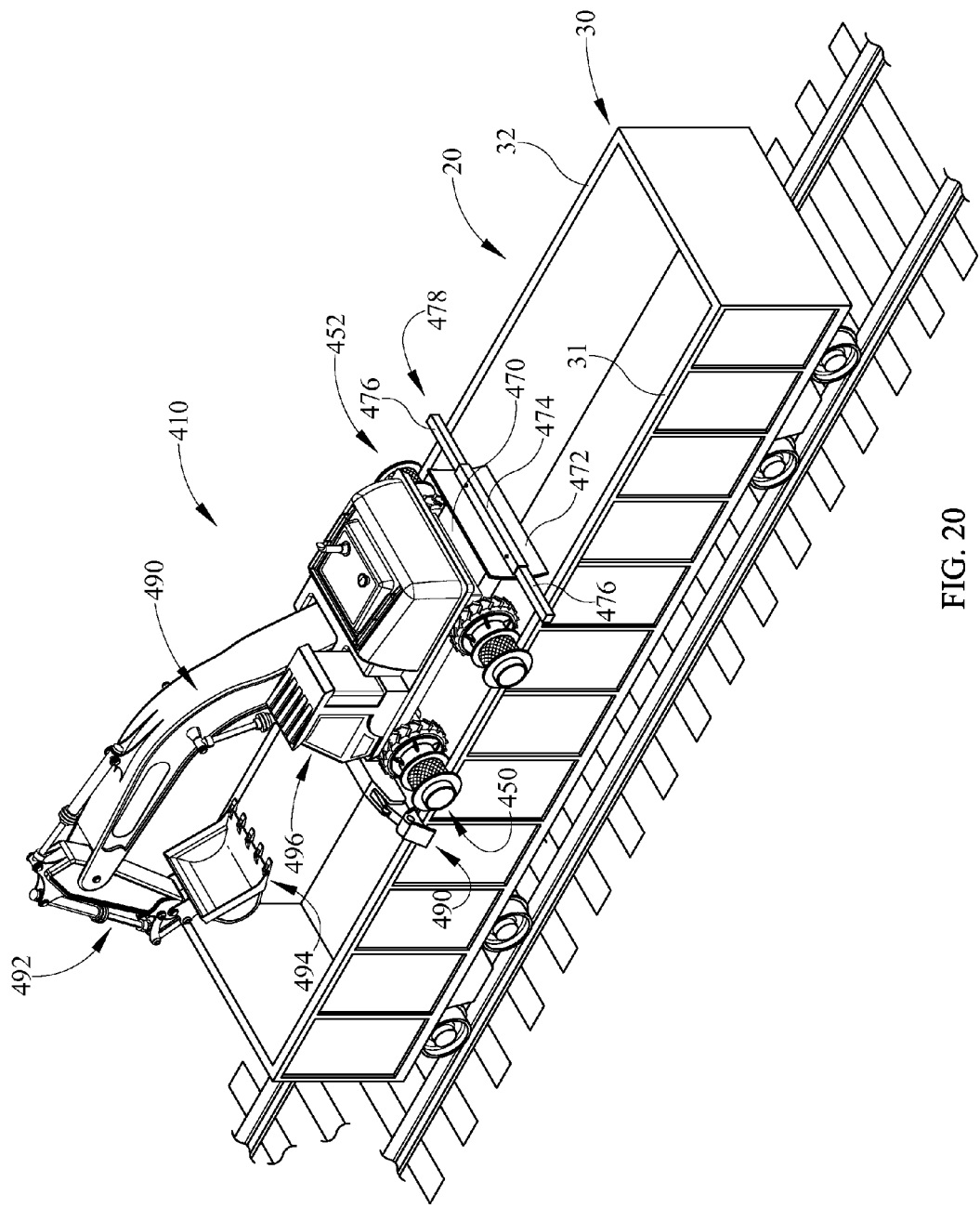
FIG. 20 depicts a perspective view of the alternative gondola carriage assembly of FIG. 19 on a gondola.

Referring again to FIG. 19 and FIG. 20, at the rear of the frame or chassis 442 is an arm which may be extendable and raised or lowered. Although a single arm 470 is shown, the arm structure 470 may be formed of multiple arms or a linkage assembly extending between the chassis 442 and a blade 472 connected to the at least one arm 470. The blade 472 may be utilized to scrape or remove material impeding the travel of the powered vehicle 480. Connected to the blade 472 is a structural tubing element 474. The tubing element 474 is shown extending along a front surface of the blade 472 but may be located on a lower edge, upper edge, rear surface or alternate location. Within the tubing element 474 are slidable extenders 476 which slide outwardly beyond the width of the blade 472. The extenders 476 and the tube 474 define a stabilizer bar 478 which may engage the gondola upper edges 30 in order to stabilize the gondola carriage assembly 410 when the vehicle is stopped and picking material from within the gondola 20. The extenders 476 may be removed from the tube 474 during over-the-road operation so that the assembly 410 meets width limitations for over-the-road travel. At the front end of the chassis 342 are first and second stabilizers and stabilizer legs 490. These legs may also be used to engage gondola 20 and stabilize the gondola carriage assembly 410 during operation. In combination, the stabilizer bar 478 and the stabilizer legs 490 support the mobile, powered vehicle when the vehicle is stationary on the gondola edges and is loading or unloading material from the gondola 20. This reduces or removes the loading on the axle assemblies 450, 452 and specifically the bolts 464 (FIG. 22). Alternatively, when an operator needs to move the vehicle along the gondola 20 to another gondola, the operator need only raise the stabilizer bar and retract or raise the legs 490 so that the vehicle 410 is supported by the axle assemblies 450, 452. This allows movement of the vehicle along the gondola 20.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:
1. A gondola carriage assembly for use with a gondola, comprising:
    a mobile, powered wheel driven loading vehicle having an upper portion and a lower portion, said upper portion pivotally connected to said lower portion, said lower portion including a chassis having a forward end and a rearward end, a plurality of tire assemblies at said forward end and said rearward end for movement over ground;

a cab and at least one power actuated boom controllable from said cab, said boom and said cab disposed on said upper portion of said mobile, powered wheel driven loading vehicle;

said boom having at least one portion having a first end and a second distal end, said second distal end having an implement for adding material to or removing material from said gondola;

each of said plurality of tire assemblies including a gondola wheel assembly, said gondola wheel assembly connected to each of said tire assemblies and rotatable with said tire assemblies;

each of said gondola wheel assemblies having a first flange of a first diameter connectable to said tire assembly, a second inner gondola flange of a second diameter disposed outwardly of said first flange, a wheel hub between said first flange and said second flange, said wheel hub having a diameter which is less than said first diameter and said second diameter, a third outer gondola flange disposed outwardly of said second inner gondola flange, said wheel hub further extending between said second inner gondola flange and said third outer gondola flange;

each of said gondola wheel assemblies connected to each of said plurality of tire assemblies near corners of said wheel driven loading vehicle;

said gondola wheel assemblies each rotating with rotation of each corresponding said plurality of tire assemblies of said wheel driven loading vehicle;

said gondola wheel hub of each of said gondola wheel assemblies engaging upper edges of said gondola, and said second and third flanges capturing said upper edges inhibiting excessive lateral movement of said gondola wheel assemblies relative to said upper edges;

a stabilizer bar disposed at one end of said carriage assembly, said stabilizer bar capable of engaging said gondola to stabilize said mobile, powered wheel driven loading vehicle, said stabilizer bar being extendable from a first length to a second length to allow for over-the-road travel.

2. The gondola carriage assembly of claim 1 further comprising a power source for powering said loading vehicle.

3. The gondola carriage assembly of claim 1, said boom being an articulating boom.

4. The gondola carriage assembly of claim 1, said gondola wheel hub having an outer surface with a grip-aiding surface.

5. The gondola carriage assembly of claim 1 further comprising a gripping material on an outer surface of said gondola wheel assembly.

6. The gondola carriage assembly of claim 1 wherein one of said first flange and said second flange is curved.

7. The gondola carriage assembly of claim 6, said first flange and said second flange having stiffening flanges.

8. A gondola carriage assembly, comprising:
a mobile, powered wheel driven machine having:
an upper portion and a lower portion, said upper and lower portions being rotatably connected;
said lower portion having a chassis, a first pair of parallel tire assemblies and a second pair of tire assemblies connected to said chassis;
a cab and an actuatable boom disposed on said upper portion, said actuatable boom having a first end and a second end;

first and second gondola wheel assemblies located at first and second outer ends of said first pair of parallel tire assemblies respectively, said first and second wheel assemblies connected to said first pair of parallel tire assemblies and rotatable with said first pair of parallel tire assemblies;

third and fourth gondola wheel assemblies located at first and second outer ends of said second pair of parallel tire assemblies respectively, said third and fourth wheel assemblies connected to said second pair of parallel tire assemblies and rotatable with said second pair of parallel tire assemblies;

a power source and transmission for driving said first pair of tire assemblies, said second pair of tire assemblies and said gondola wheel assemblies;

each of said gondola wheel assemblies having a first gondola flange of a first diameter, a second gondola flange of a second diameter, and an intermediate trough region extending between said first and second gondola flanges having a diameter less than said first and second diameters;

said first and second gondola flanges capturing an upper gondola edge in said intermediate trough region to guide said gondola carriage assembly along a gondola;

each of said gondola wheel assemblies including a hub having a connection flange disposed inwardly of said first gondola flange, said hub extending between said first and second gondola flanges.

9. The gondola carriage assembly of claim 8, each of said connection flanges connected to said tire assemblies.

10. The gondola carriage assembly of claim 9, said connection flange disposed at an end of each of said gondola wheel assemblies.

11. The gondola carriage assembly of claim 8, further comprising at least one stabilizer at a front of said driven machine and at least one stabilizer at a rear of said driven machine.

12. The gondola carriage assembly of claim 11 further comprising extenders on at least one of said front stabilizer and at least one of said rear stabilizer.

13. A gondola carriage assembly, comprising:
a mobile, powered wheel driven loading vehicle having:
an upper portion rotatably connected to a lower portion, said upper portion having a cab, an actuatable boom and an implement for moving material, said actuatable boom having a first end pivotally connected to said upper portion and said implement at a second end;
said upper portion rotatable about a vertical axis and said actuatable boom pivotable about a horizontal axis;
said actuatable boom having articulating portions, said implement disposed at a distal end of one of said articulating sections;
said lower portion having a chassis and a plurality of wheel assemblies, each of said wheel assemblies having at least one wheel and at least one tire for movement over ground;
at least one gondola wheel assembly connected to each of said plurality of wheel assemblies, each of said at least one gondola wheel assembly having a first gondola flange of a first diameter disposed outward of each of said plurality of wheel assemblies and a second gondola flange of a second diameter disposed outward of said first gondola flange, a wheel flange connected to each of said wheel assemblies and disposed inwardly of said first gondola flange, a hub portion extending between said wheel flange and said second flange, said hub portion having a diameter which is less than at least one of said first and second flanges for receiving an upper edge of a gondola;

each of said gondola wheel assemblies rotatable with each of said plurality of wheel assemblies to drive said mobile powered wheel driven vehicle along the upper edge of said gondola;

wherein driving of said plurality of wheel assemblies causes rotation of said gondola wheel assembly to drive said vehicle along said upper edge of said gondola.

14. The gondola carriage assembly of claim 13, further comprising at least one of first and second stabilizers having slidably extendable tubes to engage said gondola, said extendable tubes being slidably removable to allow for over-the-road travel.

\* \* \* \* \*